US 7,043,660 B1

(12) United States Patent
Bolar

(10) Patent No.: US 7,043,660 B1
(45) Date of Patent: May 9, 2006

(54) SYSTEM AND METHOD FOR PROVIDING DISTRIBUTED FAULT MANAGEMENT POLICIES IN A NETWORK MANAGEMENT SYSTEM

(75) Inventor: Daniel R. Bolar, Citrus Heights, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 657 days.

(21) Appl. No.: 09/972,541

(22) Filed: Oct. 8, 2001

(51) Int. Cl.
*G06F 11/00* (2006.01)

(52) U.S. Cl. .......................................................... 714/4
(58) Field of Classification Search ..................... 714/4
See application file for complete search history.

(56) References Cited

U.S. PATENT DOCUMENTS

| | | | |
|---|---|---|---|
| 5,742,762 A * | 4/1998 | Scholl et al. ................ 709/200 |
| 5,777,549 A * | 7/1998 | Arrowsmith et al. ........ 340/506 |
| 6,381,639 B1 * | 4/2002 | Thebaut et al. .............. 709/222 |
| 6,477,572 B1 * | 11/2002 | Elderton et al. ............. 709/224 |
| 6,513,129 B1 * | 1/2003 | Tentij et al. ..................... 714/4 |
| 6,578,076 B1 * | 6/2003 | Putzolu ....................... 709/223 |
| 6,664,978 B1 * | 12/2003 | Kekic et al. ................. 345/733 |
| 6,671,724 B1 * | 12/2003 | Pandya et al. ............... 709/226 |
| 6,678,835 B1 * | 1/2004 | Shah et al. ...................... 714/4 |
| 6,751,659 B1 * | 6/2004 | Fenger et al. ................ 709/223 |
| 6,782,420 B1 * | 8/2004 | Barrett et al. ................ 709/223 |
| 2003/0009711 A1 * | 1/2003 | Kuhn et al. .................... 714/57 |
| 2003/0195957 A1 * | 10/2003 | Banginwar ................... 709/223 |
| 2004/0064541 A1 * | 4/2004 | Ebata et al. ................. 709/223 |
| 2004/0153692 A1 * | 8/2004 | O'Brien et al. ................. 714/4 |

OTHER PUBLICATIONS

U.S. Appl. No. 09/345,634 *Fault Management system and Method*, Maarteen Tentij et al., filed Jun. 30, 1999.

(Continued)

*Primary Examiner*—Bryce P. Bonzo
*Assistant Examiner*—Michael Maskulinski

(57) ABSTRACT

The present invention is directed to a system and method of distributing network management tasks and policies within network management systems. Distribution of management tasks and policies onto concurrently operating management server allows for increased processing capabilities. Data control behavior may be defined on gateway machines used to normalize network messages. Such data control behavior facilitates in determining which policies are relevant to various networking situation as well as transmitting information regarding the network situations to appropriate management servers.

24 Claims, 15 Drawing Sheets

OTHER PUBLICATIONS

U.S. Appl. No. 09/469,025 *System and Method for Policy-Based Network Management*, Maarten Tentij, filed Dec. 21, 1999.

U.S. Appl. No. 09/770,427 *System and Method for Managing a Communication Network Utilizing State-Based Polling*, Semih Secer, filed Jan. 26, 2001.

U.S. Appl. No. 09/816,693 *Object-Driven Network Management System Enabling Dynamically Definable Management Behavior*, Semih Secer, filed Mar. 22, 2001.

U.S. Appl. No. 09/945,111 *System and Method for Flexible Processing of Management Policies for Managing Network Elements*, Gary R. Klein et al., filed Aug. 31, 2001.

U.S. Appl. No. 09/945,112 *User-Friendly System and Method for Defining Policies for Managing Network Elements*, Gary R. Klein et al., filed Aug. 31, 2001.

U.S. Appl. No. 09/945,372 *System and Method for Defining Management Policies for Managing Network Elements*, Gary R. Klein et al., filed Aug. 31, 2001.

* cited by examiner

FIG. 7L

| Condition | Description |
|---|---|
| Var | Test the value of a policy control parameter |
| Alarm Instances | Test the number of alarm instances |
| Alarm Severity | Test the severity of the triggered alarm |
| Has Alert | Test is the incoming alarm already has an alert |
| Alert Percent | Check the percentage of alarms that have alerts |
| Group One Per... | Check the percentage of alarms in group one that have alerts |
| Group Two Per... | Check the percentage of alarms in group two that have alerts |
| Child Alarm Per... | Check the percentage of child MOs that have alarms |
| Parent Alarm | Test if the parent MO has an alarm |
| MO Exists | Test the existence of an MO |

FIG. 7M

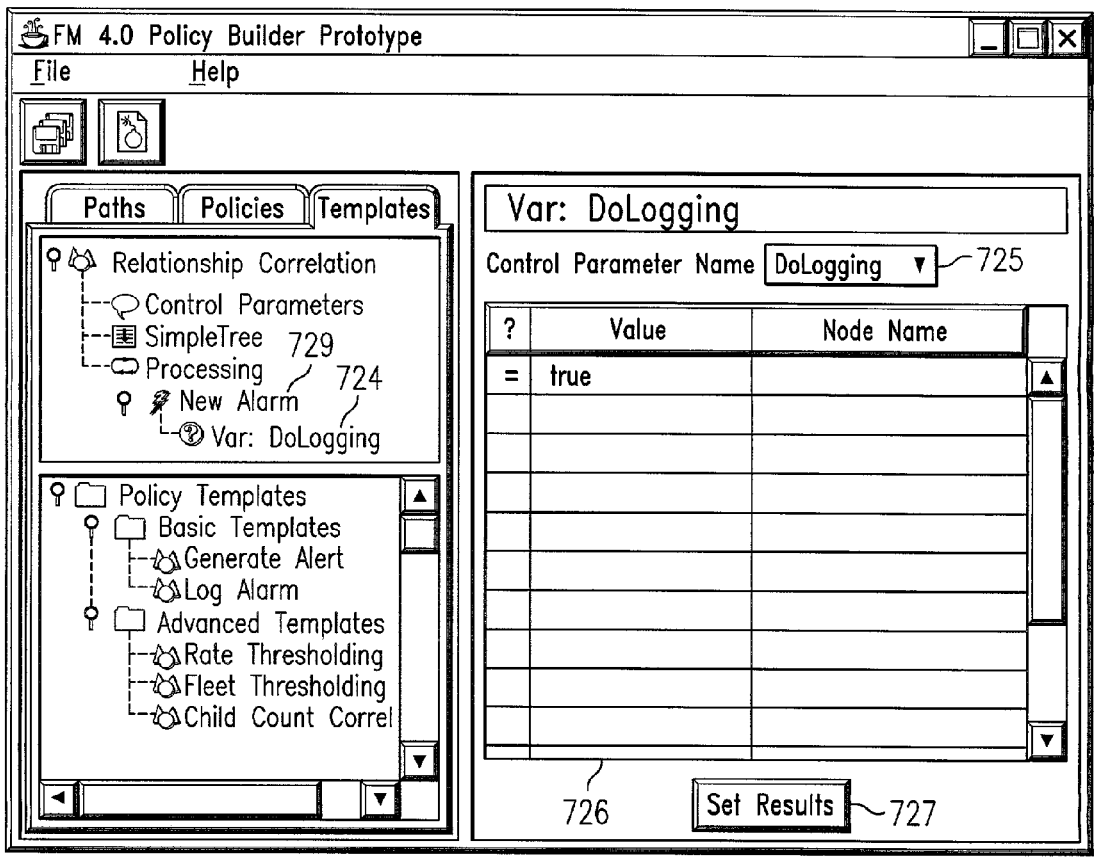

SYSTEM AND METHOD FOR PROVIDING DISTRIBUTED FAULT MANAGEMENT POLICIES IN A NETWORK MANAGEMENT SYSTEM

CROSS-REFERENCE TO RELATED APPLICATIONS

This application is related to co-pending application entitled "FAULT MANAGEMENT SYSTEM AND METHOD," assigned Ser. No. 09/345,634, filed Jun. 30, 1999; co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR MANAGING A COMMUNICATION NETWORK UTILIZING STATE-BASED POLLING," assigned Ser. No. 09/770,427, filed Jan. 26, 2001; and co-pending application entitled "OBJECT-DRIVEN NETWORK MANAGEMENT SYSTEM ENABLING DYNAMICALLY DEFINABLE MANAGEMENT BEHAVIOR," assigned Ser. No. 09/816,693, filed Mar. 22, 2001, all of which are assigned to a common assignee and the disclosures of which are hereby incorporated herein by reference. This application is also related to co-pending application entitled "SYSTEM AND METHOD FOR DEFINING MANAGEMENT POLICIES FOR MANAGING NETWORK ELEMENTS," assigned Ser. No. 09/945,372, filed Aug. 31, 2001; co-pending application entitled "SYSTEM AND METHOD FOR FLEXIBLE PROCESSING OF MANAGEMENT POLICIES FOR MANAGING NETWORK ELEMENTS," assigned Ser. No. 09/945,111, filed Aug. 31, 2001; and co-pending application entitled "USER-FRIENDLY SYSTEM AND METHOD FOR DEFINING POLICIES FOR MANAGING NETWORK ELEMENTS," assigned Ser. No. 09/945,112, filed Aug. 31, 2001.

BACKGROUND OF THE INVENTION

1. Technical Field

The present invention relates in general to network management systems, and more particularly to a system and method which enable distribution of policies that define management behavior for managing a communication network.

2. Background

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. Accordingly, network management and operations have become crucial to the competitiveness of communication companies, utilities, banks and other companies operating Wide Area Networks (WANs) of computer devices and/or other network types and devices, including SONET, Wireline, Mobile, Internet Protocol (IP) devices, etceteras. For instance, many companies currently use customized "legacy" network management systems (NMSs) and operations support systems (OSSs). Various implementations of NMSs/OSSs are available in the prior art for managing networks and network elements.

Thus, management systems ("MSs," which encompass both NMSs and OSSs) have been implemented in the prior art for managing communication networks and network elements. Given that it is often desirable to manage various network elements (e.g., various types of devices, including without limitation routers, switches, computer equipment, etcetera), various types of management systems have been developed for managing such elements.

One area of management involves fault management. Fault alarm incidents (or messages) are routinely generated for the various components of a network to allow the service provider (or system administrator) to monitor the operational state of the network. Fault management systems generally receive and process these alarm incidents in accordance with fault management objectives as defined by the service provider.

Traditionally, configuring the management system to implement a desired management behavior, such as a desired alert generation, required development of software code that is executable to perform the desired management behavior. Such software code may, for example, be written in a programming language, such as C, C++, Pascal, BASIC, or other programming language known in the art. Because the customer generally does not have access to the source code of the management system, the customer may be required to develop independent code that is capable of interacting with the management system to implement the desired management behavior, or (more typically) request that the provider of the management system develop such code that implements the desired management behavior into the management system.

More recently, management systems have been developed that enable a customer limited ability to configure management behavior thereon. More specifically, management systems have been developed that include an interface program with which a customer may interact to configure, at least to a limited extent, the management behavior of the management system. For example, an interface program may be included that enables a user to input rules that are to govern the behavior of the management system. Such rules may, for example, be written by the user in the form of relatively simple "IF THEN" statements. The rules may be input by the user to govern such management behavior as alert generation, correlation, suppression, thresholding, and logging, as examples. Once developed by the user, the MS may then execute such rules to manage the network elements in the desired manner. For instance, events detected for various network elements may be correlated in some manner (as may be specified by a user-defined rule) to enable the MS to perform a desired behavior (or task) upon detecting the specified correlation of events. Also, alarms relating to certain events may be suppressed (as defined by a user-defined rule) as such events may be residual events resulting from another event that has already been reported by the MS to the system administrator.

A threshold number may be specified for certain events (within a user-defined rule) to avoid generating alerts for events that are not actually indicative of a problem. For instance, a process that is suppose to be running within the network may be polled periodically by the MS to ensure that it is operational and responsive. Upon initially being polled, the process may be too busy to immediately respond to the poll. Accordingly, the non-responsiveness of the process may not be indicative of a situation for which an alert should be generated, but instead may only be the result of the process being busy with other tasks at the time it was polled. Thus, for example, a threshold may be defined to specify that an alert is to be generated only if the process fails to respond to three consecutive polls in order to avoid unnecessary generation of alerts.

As another example, a user-defined rule may specify that an alert is to be generated having a non-critical severity when a first set of conditions are encountered and such rule may further specify that the alert is to have its severity escalated to indicate critical severity upon a second set of conditions being encountered. For instance, 75% CPU utilization rate on a particular network element may, according to a user-defined rule, generate an alert of relatively minor severity, but upon the network element's CPU utilization rate increasing to 95% or greater, the rule may specify that the alert is to be escalated to critical severity.

As yet another example of management behavior that may be defined by a rule, event logging may be performed. That is, events detected by the MS for network elements may be logged to a file (e.g., to a database or other data structure for storing data). Those of ordinary skill in the art will recognize other management tasks in addition to the exemplary tasks described briefly above that may be defined in rules implemented on the MS to control the management of network elements by the MS. That is, user-defined rules may be implemented to configure the management behavior of the MS in various ways.

In existing MSs, all management processing is generally performed at a central processing system that executes all management tasks. In the event the central processing system is required to process large number of management tasks, this central processing system may experience strain in terms of communications throughput, memory and processing performance. For example, a number of network elements, all transmitting messages to the central processing system, are capable of easily overloading the resources available to the central processing system. Without the ability to process management tasks in a timely manner, far more serious network problems may occur. Likewise, such a situation impacts the user's ability to communicate with the system, eventually causing undue frustration.

In particular MS implementations, the upgrade and replacement of memory and central processing unit components is employed to alleviate such performance issues. Furthermore, upgrades to communications systems are also utilized in order to improve communication system performance. These proposed solutions are both costly and inflexible. For example, replacement of computing peripherals forces the disposal of a currently operational component for a newer, more expensive component that is capable of providing the memory or processing power needed by the central processing system in order to function at the capacity desired. Additionally, most central processing systems possess limitations on the amount of memory and processing power they are capable of supporting, thus leading to the eventual prevention of future upgrades. These limitations may arise due to usage of all memory sockets on the central processing system, insufficient system bus speeds and the fact that current state of the art processing power may be inadequate. Accordingly, a desire exists for a system and method that improve performance of a MS. More specifically, a desire exists for a system and method that alleviate some of the processing strain on the central processing system in performing management tasks for managing elements of a communication network.

BRIEF SUMMARY OF THE INVENTION

More recently, management policies are used for managing network elements. That is, management policies may be created within a MS to define how network elements are to be managed. In general, a management policy is a set of stored parameters that drive the decision-making of the MS. A management policy may, for example, be defined by a software object having attributes that dictate the parameters, of the policy for driving MS decision-making. A management policy may be defined, for example, to instruct the MS that if a given alert is received, it should display the alert on an alert display screen, log the alert in a certain manner, and/or perform any number of other management tasks. For example, policies may be implemented to perform such tasks as correlation, suppression, thresholding, escalation of alert severity, logging of events, etcetera, for managing network elements.

The MS may allow a user to create policies that define management behavior for managing the network elements, and the MS may then execute such policies to manage the network elements in the desired manner. For instance, events detected for various network elements may be correlated in some manner (as defined by a policy) to enable the MS to perform a desired behavior (or task) upon detecting the specified correlation of events. Also, alarms relating to certain events may be suppressed (as defined by a policy) as such events may be residual events resulting from another event that has already been reported by the MS to the system administrator.

A threshold number may be specified for certain events (within a policy) to avoid generating alerts for events that are not actually indicative of a problem. For instance, a process that is suppose to be running within the network may be polled periodically by the MS to ensure that it is operational and responsive. Upon initially being polled, the process may be too busy to immediately respond to the poll. Accordingly, the non-responsiveness of the process may not be indicative of a situation for which an alert should be generated, but instead may only be the result of the process being busy with other tasks at the time it was polled. Thus, for example, a threshold may be defined to specify that an alert is to be generated only if the process fails to respond to three consecutive polls in order to avoid unnecessary generation of alerts.

As another example, a policy may define that an alert is to be generated having a non-critical severity when a first set of conditions are encountered and the policy may further specify that such alert is to have its severity escalated to indicate critical severity upon a second set of conditions being encountered. For instance, 75% CPU utilization rate on a particular network element may, according to a defined policy, generate an alert of relatively minor severity, but upon the network element's CPU utilization rate increasing to 95% or greater, the policy may specify that the alert is to be escalated to critical severity.

As yet another example of management behavior that may be defined by a policy, event logging may be performed. That is, events detected by the MS for network elements may be logged to a file (e.g., to a database or other data structure for storing data). Those of ordinary skill in the art will recognize other management tasks in addition to the exemplary tasks described briefly above that may be defined in policies within the MS to control the management of network elements by the MS.

Management systems may provide a user (e.g., a system administrator) a program, which may be referred to as a "policy builder," which provides an interface that enables at least limited ability for a user to create or modify management policies. That is, a user may interact with such policy builder program to specify, for example, certain network elements (which may be represented as objects) and define certain management tasks, such as correlation of events, suppression of alerts, thresholding, escalation of alert severity, event logging, etc., that are to be used in managing the specified network elements.

Once a policy is created and activated on a MS, the policy may work to perform the defined management tasks, such as generating alerts to a user display. For example, a system administrator may have one or more alert displays to which the MS presents alert messages to notify the system administrator of events detected by the MS. Such alerts may be generated in accordance with the policies defined for the MS. For instance, certain alerts may be suppressed, as specified by policies defined for the MS, and other alerts may be escalated in severity based on conditions being encountered as specified by a policy defined for the MS. Similarly, certain events detected on the network may be correlated in accordance with the defined policies, and certain alerts may be generated and/or suppressed based upon a particular correlation pattern specified by a defined policy being detected.

Existing MSs operate policy execution within a single thread. As situations occur that trigger policies, the central processing system executes the policies in the order of reception, thus causing an accumulation of policies that need to be executed. In a particular MS system, the ability to prioritize a policy based on the policy type may be available. Such prioritization only serves to manipulate the policy execution order and does not hasten the processing of multiple policies. Additionally, execution of all management policies at the central processing system often places an undesirable processing strain of the central processing system, thereby negatively effecting fault management provided by such system.

The present invention is directed to a system and method which provide distributed fault management policies in a network management system. As described above, prior art network management systems often experience heavy processor and network strain mainly due to the centralized structure of such systems. Various embodiments of the present invention provide a system and method of distributing the computation of management policies among a series of distributed management servers. Such distributed management servers execute management behaviors defined by fault management policies. This results in the distribution of computational demand as opposed to centralized computation and thus dramatically greater policy throughput and faster policy execution.

According to at least one embodiment, a system of managing network elements is disclosed, which compromises at least one network element that is managed by the management system. The system is further comprised of a management processor in which at least one distributed management server is communicatively coupled. Additionally, at least one policy object, residing on the distributed management servers, provides information describing management behavior for the network elements.

One embodiment of the present invention further includes at least one gateway communicatively coupled to the distributed management servers and communicatively coupled to the network element. The gateway(s) may further include at least one decision object stored therein for defining decision behavior for routing information regarding the network element to relevant distributed management servers and policy objects. Additionally, the system may include a policy builder user interface communicatively coupled to the policy server. Such policy builder user interface may assist in the generation of policy objects.

In certain embodiments of the present invention a policy server may be communicatively coupled to at least one distributed management server. Such policy server, storing at least one policy object, may distribute the policy object it stores to one or more distributed management server. This distribution may be performed in the manner described by a configuration file residing on the policy server.

It may be preferable to include an alert server communicatively coupled to the management processor. The alert server may generate alerts based on fault conditions transmitted by at least one distributed management system in accordance with a policy object. Likewise, embodiments may additionally include a management information base communicatively coupled to the management processor. Such management information base stores objects corresponding to the managed network elements, as well as describing interrelationships between the network elements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
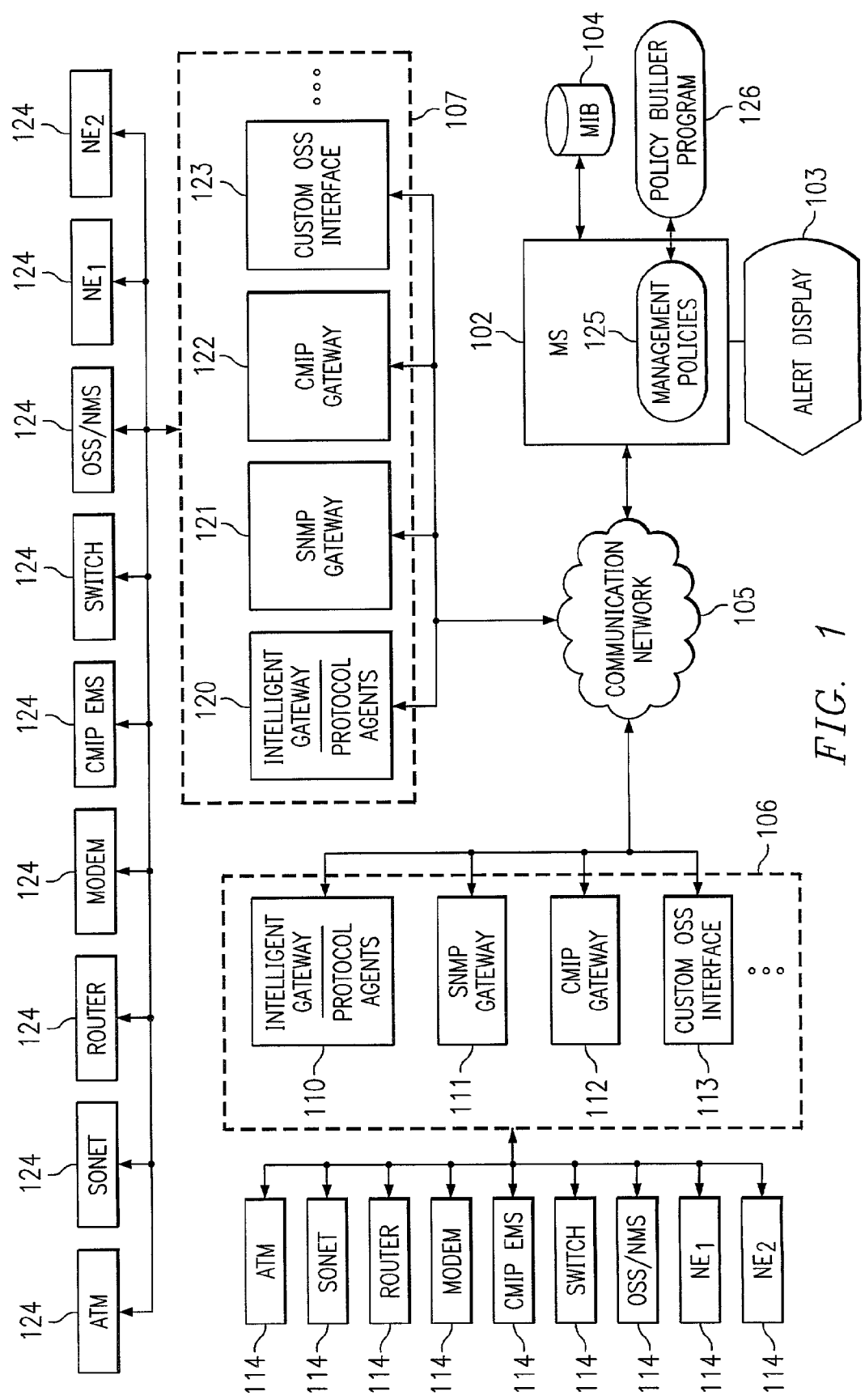
FIG. 1 shows an exemplary network management system.

Various embodiments of the present invention provide a system for managing network elements represented by software objects by utilizing a number of management policies distributed across various fault management servers. Furthermore, various embodiments also provide a user interface used to interactively administer the distribution and implementation of such management policies. As will be discussed in greater detail hereafter, a preferred embodiment of the invention involves the use of a number of distributed fault management servers capable of processing various management policies based on messages or incidents detected by the management system for an assortment of networks and/or network elements managed thereby. Accordingly, much of the processing associated with managing elements of a communication network may be distributed among a plurality of fault management servers, thereby reducing the processing load placed on any one processor (such as a central processing system) and improving the overall processing capability of the fault management system.

Given that it is often desirable to manage various network elements (e.g., various types of devices, including without limitation routers, switches, computer equipment, etc.), various types of management systems have been developed for managing such elements. Further, because different types of network elements may communicate in different protocols, management systems may utilize different processes for managing different types of network elements. For instance, processes that may be referred to as "gateway" processes are sometimes implemented in management systems for managing particular types of network elements. For instance, a Simple Network Management Protocol (SNMP) gateway process may be implemented for managing SNMP devices, and a Common Management Information Protocol (CMIP) gateway process may be implemented for managing CMIP devices. Thus, one or more gateway processes may be implemented for managing network elements that communicate in a particular communication protocol. Thus, gateways may be implemented to receive and normalize messages for various types of network elements being managed. Normalizing involves translating (or mapping) a received incident (or message) into a suitable, consistent form (e.g., ASCII), which may be discernable within the entire management system.

Such gateway processes may, for example, receive unsolicited messages from their respective network elements and/or may poll their respective network elements for certain information. MSs commonly recognize faults (or "traps") generated within the network and/or utilize polling of the network elements to provide management. For example, IP and SNMP devices may generate fault messages (which may be referred to as traps), which are unsolicited messages that may be received by the management system. Examples of such trap messages include messages that indicate a network element's CPU utilization is too high, a network element just rebooted, available data storage capacity is low on a network element, and an interface on a network element is down, as examples. Various other types of unsolicited trap messages may be generated by a network element and received by a MS, as those of ordinary skill in the art will recognize. Such messages are generally generated in a defined protocol, such as SNMP, which the management system can recognize (e.g., a gateway process may recognize) to process the received messages.

Some management systems may desire information regarding the performance of network elements that is not provided through unsolicited messages generated by such network elements. In such case, gateways may be implemented to poll their respective network elements for particular information. For instance, a gateway may be implemented to poll its respective network element(s) to gather information about various operational characteristics of such network element(s). Gateways of management systems are typically implemented to periodically poll their respective network elements according to pre-set time intervals. For instance, a gateway may be pre-set to poll its respective network element(s) once every five minutes or once every twenty minutes, as examples. Gateways typically poll network element(s) to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera.

Gateways may be implemented in any of several different arrangements within management systems for polling and/or otherwise monitoring the operations of various network elements. As one example, gateways may be implemented in a non-distributed manner within a MS for managing network elements. However, such a non-distributed approach may place a great operational burden on the MS and may result in congestion of communication traffic to/from such MS. Accordingly, in some management systems, such as that disclosed in co-pending patent application Ser. No. 09/770,427 entitled "SYSTEM AND METHOD FOR MANAGING A COMMUNICATION NETWORK UTILIZING STATE-BASED POLLING" and co-pending application Ser. No. 09/816,693 entitled "OBJECT-DRIVEN NETWORK MANAGEMENT SYSTEM ENABLING DYNAMICALLY DEFINABLE MANAGEMENT BEHAVIOR," the gateways may be distributed from the MS to ease the operational burden on the MS. At least one embodiment of the present invention may be implemented with distributed gateways for managing network elements.

An example of such a distributed approach for implementing gateways in a management system is shown in FIG. 1, which is described herein below. In certain embodiments, state models may be defined/altered by a user (e.g., a system administrator) at a central management system and then pushed out to the distributed gateways, an example of which is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, state models may be defined/altered by a user at a centralized MS and then pushed out to one or more distributed gateways via a suitable communication network that communicatively couples the centralized MS to such distributed gateways. Of course, in alternative embodiments state models may not be used for management within the gateways.

An example of an existing network management system is shown in FIG. 1. Shown is central MS 102 that may be communicatively coupled to numerous gateways distributed about the network for managing various network elements. As shown, central MS 102 may be communicatively coupled to distributed gateways or groups of distributed gateways via communication network 105. Communication network 105 may be any suitable type of communications network including, but not limited to direct computer to computer connection, a wide area network (WAN), modem to modem connection, the Internet, a combination of the above, or any other communications network now known or later developed within the networking arts which would permit communication between centralized MS 102 and distributed gateways.

For example, gateway group 106 may be implemented at one geographic location of a managed network and group 107 may be implemented at another geographic location of such managed network. Group 106 may include various gateways for monitoring (e.g., polling and receiving unsolicited messages) particular types of network elements. For instance, each gateway within group 106 may monitor network elements having particular communication protocols, including as examples intelligent gateway 110, SNMP gateway 111, CMIP gateway 112, and custom OSS interface gateway 113, which may monitor various network elements 114, such as ATMs, Sonets, routers, modems, CMIP EMSs, switches, OSSs/NMSs, as well as various other network elements local to group 106. Likewise, group 107 may include various gateways for monitoring (e.g., polling and receiving unsolicited messages) particular types of network elements. Each gateway of group 107 may monitor network elements having particular communication protocols, including as examples intelligent gateway 120, SNMP gateway 121, CMIP gateway 122, and custom OSS interface gateway 123, which may monitor various network elements 124, such as ATMs, Sonets, routers, modems, CMIP EMSs, switches, OSSs/NMSs, as well as various other network elements local to group 107. Each of the distributed gateways may, for example, be any suitable processor-based device operable to manage (e.g., receive unsolicited messages and/or poll) its respective network elements. As described above, the gateways may be implemented to receive and normalize messages for various types of network elements being managed.

Data collected by the distributed gateways may be communicated to central MS 102. For example, polling services (which may include state models) may be loaded onto the distributed gateways of groups 106 and 107, and such gateways may execute the polling services to monitor their respective network elements. In this manner, the gateways can act as filters by only communicating necessary data about the network elements back to central MS 102, thereby alleviating some of the processing and communication traffic burden from central MS 102.

Particular implementations of existing management systems are object-driven. An example of such an object-driven management system is further described in co-pending patent application Ser. No. 09/816,693 entitled "OBJECT-DRIVEN NETWORK MANAGEMENT SYSTEM ENABLING DYNAMICALLY DEFINABLE MANAGEMENT BEHAVIOR," the disclosure of which has been incorporated herein by reference. For instance, network elements and management behavior are preferably represented by software objects within the management system. Such objects may be stored in management information base (MIB) 104, which may, for instance, be a database or other suitable data storage management. MIB 104 is communicatively coupled to central MS 102. More specifically, MIB 104 may be integrated within or external to central MS 102, and a management process executing on central MS 102 is capable of accessing MIB 104 to store/retrieve objects.

MS 102 includes management policies 125 executing thereon to define management behavior for MS 102 to utilize in managing the network elements 114 and/or 124. For example, such management policies 125 may define such management behavior tasks as performing correlation between certain events (or alarms or incidents) detected by gateways 110–113 and/or 120–123 for network elements 114 and/or 124, performing suppression of certain alerts, performing thresholding, performing alert escalation, performing event logging, as well as various other management behavior tasks as are well known in the art. Thus, for instance, messages passed through the filtering gateways are processed by central MS 102 in accordance with management policies 125 that define the management behavior to be invoked.

Figure 2:
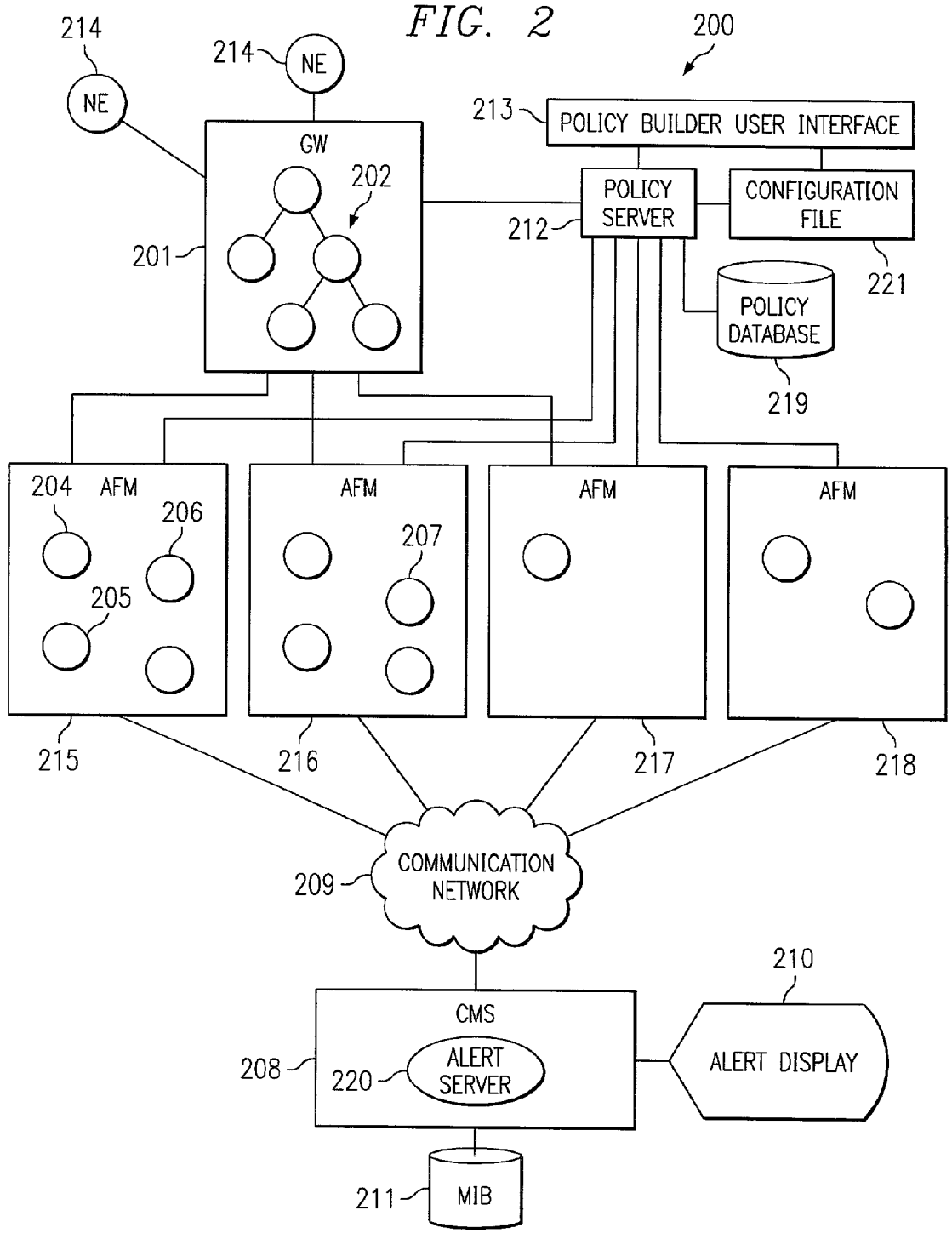
FIG. 2 shows an exemplary distributed fault management system.

Also, as shown in FIG. 2, one or more alert displays 103 (e.g., work stations equipped with input and output devices, such as a computer display) may be communicatively coupled to central MS 102 for enabling interaction with a user (e.g., a network administrator), including displaying of alerts in accordance with management policies 125. Also, a policy builder program 126 may be executing on MS 102 or on a processor-based device, such as a PC, that is communicatively coupled to MS 102. Policy builder program 126 provides an interface with which a user may interact to create management policies 125.

Existing management systems as described by FIG. 1 contain MS 102 for carrying out management tasks as defined by management policies 125 (which may be user-defined) for managing network elements 114 and 124. Distributed servers have traditionally not be utilized for implementing management behavior as defined by management policies. As a result, a great computational load is generally placed on the central processing system of existing management systems.

At least one embodiment of the present invention involves the use of distributed fault management servers that perform the actions associated with various management policies (which may be user defined). An example of such a distributed approach for a fault management system is further shown in FIG. 2. In FIG. 2, network management system 200 is shown, which includes distributed advanced fault management servers (AFMs) 215, 216, 217 and 218. AFM servers 215–218 are processor-based devices, which may also comprise a data storage device, such as random access memory (RAM), hard disk, and/or cache memory, as examples. Each of AFM servers 215–218 may be capable of executing one or more of different fault management policies. As described in the background, a management policy defines what management actions to take (if any) for collected data (e.g., messages or "incidents" received from a network element) based on its configured behavior. It should be recognized that while four exemplary AFMs are shown in FIG. 2, any number of AFMs may be included in various different implementations.

According to embodiments of the present invention, a single AFM server can store as many management policies as the system administrator deems necessary. Likewise, multiple instances of the same policy may be executing on a single AFM. For instance, if AFM server 216 comprises multiple processors, it may be in the system administrator's best interest to execute a greater number of management policies on such AFM server 216 than on an AFM server having fewer processors. Also, if one management policy is used frequently, a system administrator may opt to distribute multiple instantiations of the particular management policy across a set of AFM servers in order to decrease the computing load on a smaller subset of AFM servers. Examples of management policies distributed to AFMs 215–218 in the example of FIG. 2 include policies 204, 205, 206 and 207. Some embodiments of the present invention may include an administrative tool which allows a system administrator to define the hosts and polices that are used by AFM servers 215–218. Each policy may be indexed or referred to by a different representative name or number in order to differentiate the policy with a functionally identical policy.

AFM servers 215–218 are each communicatively coupled to one or more gateways such as gateway 201. Such AFM servers 215–218 are also communicatively coupled to policy server 212 and central management system 208. Furthermore, policy server 212 is communicatively coupled to policy builder user interface 213 and Policy Database 219. Policy builder user interface 213 allows a user to define and generate an assortment of policies, preferably via a graphical user interface. An example of such policy builder user interface that may be implemented is further described in co-pending U.S. patent application Ser. No. 09/945,372 entitled "SYSTEM AND METHOD FOR DEFINING MANAGEMENT POLICIES FOR MANAGING NETWORK ELEMENTS, filed Aug. 31, 2001, the disclosure of which has been incorporated herein by reference. Once created via policy builder 213, the management policies are then exported to policy server 212 which stores the policies into policy database 219 for future use. Additionally, policy builder 213 may designate which AFM servers 215–218 are to execute a particular management policy. For instance, policy builder 213 may interface with configuration file 221, which is in turn interfaced to policy server 212. A user may, via policy builder 213, designate one or more AFM servers 215–218 that are to execute a particular management policy, and such designation may be stored in configuration file 221. Policy server 212 may use configuration file 221 in determining the manner in which to distribute the management policies among AFM servers 215–218.

Figure 3:
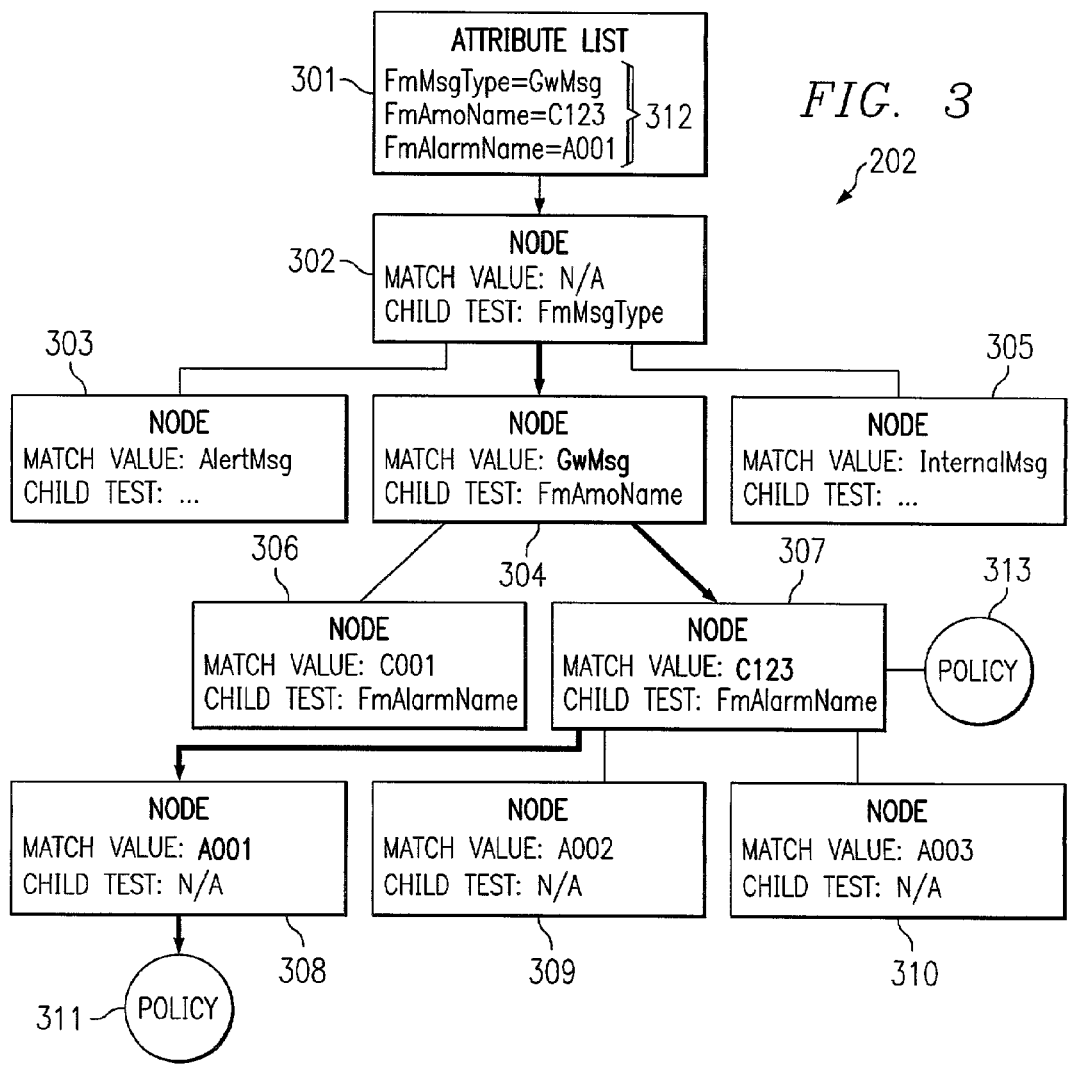
FIG. 3 shows an exemplary decision object in the form of a data path tree that may be implemented in a distributed network management system.

According to the exemplary embodiment of FIG. 2, gateway 201 receives messages from network elements 214. Gateway 201 parses and normalizes the information from the received messages in a manner that allows data path tree 202 to process the messages. Due to the distribution of fault management policies such as policies 204–207 across AFMs 215–218, it may be necessary to provide a mechanism that facilitates in selecting the correct AFM server and management policy in which to transmit network messages received from network elements 214. In this embodiment, routing logic 202 (e.g., a data path tree) provides a means of determining the management policy to invoke and the appropriate AFM for executing the chosen management policy. As messages and alerts are received by gateway system 201, routing logic 202 executed thereon to determine the management policy(ies) and AFM(s) that are to receive such messages and alerts. FIG. 3 describes one implementation of routing logic 202 in further detail. In at least one embodiment, routing logic 202 functions as a decision tree in determining which of the management policies (such as policies 204–207) of AFMs 215–218 to provide with the normalized data collected by gateway 201 from network elements 214. Selecting the appropriate AFM server and policy is preferably done by examining various attributes that are extracted from the messages received by gateway 201. Routing logic 202 may traverse the decision tree until a node that corresponds with relevant attributes is reached.

During this process, gateway 201 may query policy server 212 for information regarding the deployed management policies. Once routing logic 202 has selected an AFM server and management policy to invoke responsive to a received message, such received message is forwarded to the selected AFM server for processing thereby in accordance with the selected policy.

For exemplary purposes, assume the traversal of a decision tree by logic 202 results in the selection management policy 204 to be invoked on AFM 215. Thus, the normalized message is sent from gateway 201 to AFM 215, where it is processed according to the management policy 204. The procedure of processing a management policy may include querying CMS 208 and MIB 211 for information regarding network topology and current alert status, for example. As another example, such policy processing may include AFM 215 invoking CMS 208 to perform alert functions using alert server 220. More specifically, alert server 220 may generate an alert to alert display 210 to notify a user (e.g., system administrator) of a fault condition. Thus, the alert may be a message that appears on the system administrator's workstation. Alternatively, an email message or even an automated telephone message that includes the alert may be generated by CMS 208 (e.g., by alert server 220), depending on the severity of the situation as judged by the parameters of the policy being executed.

FIG. 3 depicts an exemplary implementation of routing logic 202 of FIG. 2, which utilized a decision tree and therefore in this implementation routing logic 202 may be referred to as data path tree 202. In this example, data path tree 202 uses messages received by gateway 201 to traverse its decision tree and determine appropriate destination policy(ies) to be invoked for processing such messages. In embodiments of the present invention, the root node of a data path tree acts as the single point of input into the fault management system. Input to a data path may comprise messages received by a gateway, alert responses, which are messages generated when a system administrator receives or acts upon an alert sent to alert display 210 of FIG. 2, and internal alarms produced by a management policy that are fed back into a data path tree. As such, data path tree 202 may recognize at least three sources of input: messages from gateway 201 (which may be normalized messages generated by the gateway responsive to messages received thereby from a network element), messages from central management system 208, and a coexisting management policy. A coexisting management policy may be any policy deployed by the management system including the policy most recently triggered by the data path tree, such as policy 204.

According to one embodiment, input to data path tree 202 is organized as an attribute list, such as Attribute List 301. Exemplary Attribute List 301 is shown in FIG. 3, which comprises input attributes 312. One attribute contained in Attribute List 301 (not shown in FIG. 3) may identify the source of input attributes 312. Attributes of a gateway message or alert are used to traverse the data path tree and therefore direct source data to an appropriate policy in accordance with the configuration of data path tree 202. That is, gateway 201 may receive a message from a network element 214 and generate a normalized message comprising information that may be used to generate attributes 312 of input Attribute List 301. Not only may inclusion of attributes 312 from a gateway message be used, but the lack of attributes contained in a gateway message or alert may be used to traverse data path tree 202.

In the example shown in FIG. 3, attribute list 301 is input to data path tree 202. Each non-leaf node in data path tree 202 identifies an attribute name that is used to perform the next node selection process. That is, a Child Test may be included within a non-leaf node for use in selecting the next node of the tree. For instance, non-leaf node 302 contains attribute FmMsgType as its Child Test. Attribute list 301 is checked for FmMsgType and the system attempts to match this attribute against the Match Values of child nodes 303, 304, and 305. In this example, node 304 is found to correctly match the attribute, and thus becomes the current node. That is, the input attribute FmMsg Type of input attributes 312 is "GwMsg," which is determined to correspond with the match value of node 304, thereby causing traversal of data path tree 202 from node 302 to node 304. The process is then repeated for the now current node 304. Attribute FMAmoName matches node 307's Match Value of "C123", thus node 307 becomes the current node.

In this example, node 307 has management policy 313 associated therewith, which is invoked upon traversal of data path tree 202 for a given input attribute list reaching node 307. Thus, before the tree is further traversed, data path tree 202 communicates a copy of attribute list 301 to the policy identified in node 307's associated policy 313. Various embodiments of this invention may determine which particular AFM to send the attribute list by querying a configuration file defining the existing AFM servers and the mapping of policies on the existing AFM servers.

Data path tree 202 then proceeds by comparing the value of the Child Test of node 307, FmAlarmName, to the Match Values of nodes 308–310. In this example, node 308's Match Value of "A001" corresponds to the Match Value of attribute list 301. Therefore, data path tree 202 selects node 308 as the current node. Node 308 has management policy 311 associated therewith. Thus, upon arrival at node 308, the data path tree invokes the management policy 311 in an AFM server.

Data path trees may support multiple Match Values in a node, where a match to any one of a set of Match Values causes the node to be traversed. Likewise, a data path tree may support multiple attributes for a single Child Test. A parent node may then specify a set of attributes to check in a Child Test and the child node may specify a corresponding set of Match Values that the data path tree attempts to match with the attribute list input to the data path tree. Furthermore, the data path tree may also have support for guiding data down paths using specific values, while all other values are guided down a default path.

As stated earlier, there may also be the ability to traverse the data path tree when the value being tested does not exist in attributes list 301. For example, suppose the Child Test value for a particular node is FmObjectType, which is not included in attribute list 301; a Match Value of <NoValue> could be used to match this situation within a node to traverse the particular node. Additionally, support for regular expression matching may be implemented. In such a case, wild card matching of character sequences and other regular expression features are capable of being used in the Match Value of a node.

The fault management policies used by embodiments of the present invention allow the definition of complex rules and data analysis, such as the methods of data collection, when processing of a policy is to be triggered, what logic flow is followed, and what actions are to be taken upon the trigger of a policy. Often times, a user defining a fault management policy may wish to reuse key portions of the policy in other policies. In order to facilitate in the reuse of rules and data analysis that may be common across a number of policies, implementations of the present invention may utilize policy templates. Such policy templates provide the ability to define parameter driven behavior for a policy. Parameters may provide a means to define the variance between a policy and another policy without having to redefine the entire policy and its associated algorithms. For example, a policy template may define an algorithm implementing alert thresholding. Parameters may be defined within this exemplary policy template that determine the number of alarm instances (N) required to be encountered within a time period (T) in order to generate an alert. That is, parameters may specify the number (N) and the time period (T) to be implemented within a particular policy. One policy may use this exemplary policy template and define a set of parameter values that are relevant to the situation desired by such policy. For instance, such policy may include user-defined parameters of N=5 and T=60 seconds. Another policy may then use this same exemplary policy template and with a different set of user-defined parameter values, such as N=3 and T=300 second. In implementations of the present invention, a policy template defines controlling parameters and components used for data collection and processing. Policy templates provide users unfamiliar with all aspects of policy creation a means in which to define management policies based on pre-existing policy templates.

Figure 4A:
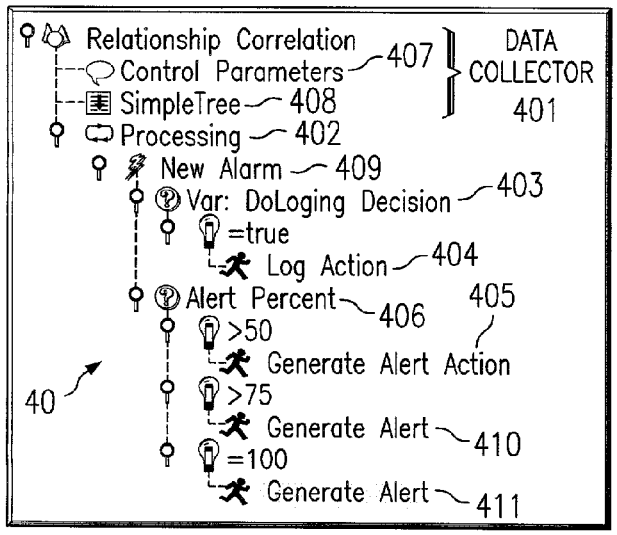
FIGS. 4A–B show exemplary policy templates and data collector implementations

FIG. 4A portrays exemplary policy template 40 that may be implemented in embodiments of the present invention. Policy template 40 is constructed in a tree fashion with nodes 402, 407 and 408 representing various characteristics of a future policy. Shown is policy template 40 containing generic processing rules 402. The creator defines key features such as data collection, policy triggering, and logic and action algorithms in Control Parameters node 407, SimpleTree node 408, and Processing node 402 respectively. Parameters are defined in Control Parameters 407 and incorporated into Processing node 402. Within Processing node 402, child nodes 403–406 may be created. In this implementation, Child nodes 403–406 may be decision nodes or action nodes. Such decision nodes may define the logic used in the initiation of an action node, which may define data analysis and alert generation.

Processing node 402 of policy template 40 may also include a trigger, which may allow the creator to specify when to initiate the processing procedure, as may be defined in a processing node such as Processing 402. In this particular example, Processing 402 defines one trigger designated New Alarm 409. Upon the receipt of an alarm from a gateway system, a policy processing thread is started and the defined actions are performed. Such actions may include a wide range of data analysis and alert generation. In this implementation, Decision node 403 performs a comparison of the DoLogging variable against the value of true. If the comparison is successful, the action defined at Action node 404 is performed, in this case data logging. Likewise based on the value of AlertPercent decision node 406, an alert of varying severity is generated based on the corresponding in Generate Alert action nodes 405, 410, and 411.

As stated earlier, each processing variable's value corresponds with a gateway provided attribute or variable associated in Control Parameters 407. For instance, the creator may have configured Control Parameters node 407 to associate AlertPercent 406 with the memory usage reported by a gateway element. Since different levels of alert severity depend on the value of AlertPercent 406, in this case the percent of memory utilized, the action performed will vary based on the memory utilization. This same template could also be used to generate various alerts based on processor utilization by associating AlertPercent action node 406 with the processor utilization attribute of a received message within Control Parameters 407.

SimpleTree 408 may be used to organize messages and alarms that are transmitted by gateway system 202. Likewise, Simple tree 408 of FIG. 4A may be used to specify which network elements (such as network elements 214 found in FIG. 2) are of importance, while also specifying the relationship between said networking elements. This information is then made available for use at Processing node 402. Various methods of describing the relationship between different systems may be used, including describing a network element as "managed by" or as "managing" another network element and describing a network element as "contained by" or as "containing" another network element. A "managed by" relationship describes a relationship within a set of network elements in which one or more of the network elements is managed by one or more of the remaining network elements. Likewise, a "managing" relationship may denote that one or more of the network elements within a group manages one or more of the other networking elements within that group. This method of relating network elements allows for a much more flexible policy processing system. For example, a policy template may be used to define a policy that takes into account the fact that a set of networking elements are dependant on a different networking element. Such information may then be used to generate alerts providing greater information about possible problems. Any number of interrelationships could be described in a data collector and appropriate action taken within the processing portion of a policy.

Figure 4B:
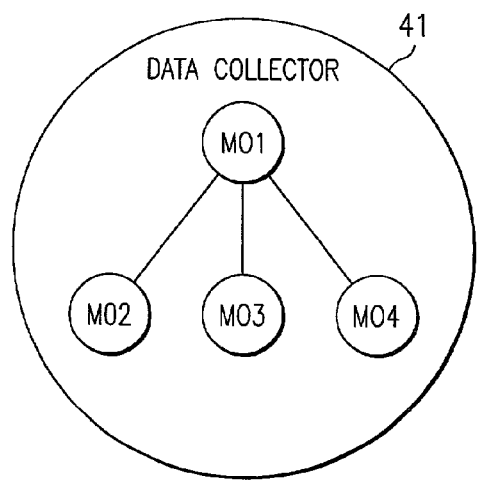

FIG. 4B uses a simple tree to demonstrate the relationship between managed objects MO1–MO4, wherein such managed objects correspond to managed network elements such as network elements 214 of FIG. 2. As shown, MO2–MO4 are shown to have a managed by relationship with MO1, whereas MO1 has a managed relationship with MO2–MO4. As an example, any new alarms generated by managed objects MO1–MO4 within data collector 401 may trigger Processing node 402 of FIG. 4A. For instance, MO1 may correspond to a power supply that supplied power to MO2–MO4. A policy, relying on the information conveyed by data collector 401, recognizes managed object MO1 as a power supply and managed objects MO2–MO4 as systems that receive power from MO1, thus, upon receipt of power failure messages from network elements MO2–MO4, the policy recognizes power supply system MO1 as one possible reason for the extensive failure. The policy may then generate an alert indicating failures in network elements MO2–MO4 and suggesting a failure in MO1. The generation of a data collector for use within a policy template is described further in conjunction with an exemplary policy builder user interface of FIGS. 7A–7N.

Policies and policy templates may be used rather extensively in embodiments of the present invention. As such policies and policy templates may describe complex network and network element interaction. Using traditional methods of rule-set design and creation may pose a challenging task to a user unfamiliar with policies and/or software programming. As such, implementations of the present invention may include a policy builder user interface that provides a user interface, preferably graphical, that assists in the design and implementation of policies and policy templates. Furthermore, the creation of data path trees, such as data path tree 202 of FIG. 2, is facilitated by a policy builder user interface.

Turning to FIGS. 5A–5G, shown are a series of screenshots portraying one embodiment of a policy builder user interface. Illustrated is the creation of a data path tree similar in function to data path tree 202 in that such data path tree is used to determine the appropriate policy and AFM to receive a message or alarm transmitted by a gateway. In this implementation, data path trees each contain an initial root node in which a plurality of children nodes may be added. Matching conditions identified within each node define which attributes of a gateway message and which values of such attributes result in the selection of the next node. Additionally, policies may be defined at each node via a policy builder user interface. Upon traversal of a node, any policies associated with the node may be executed.

Figure 5A:
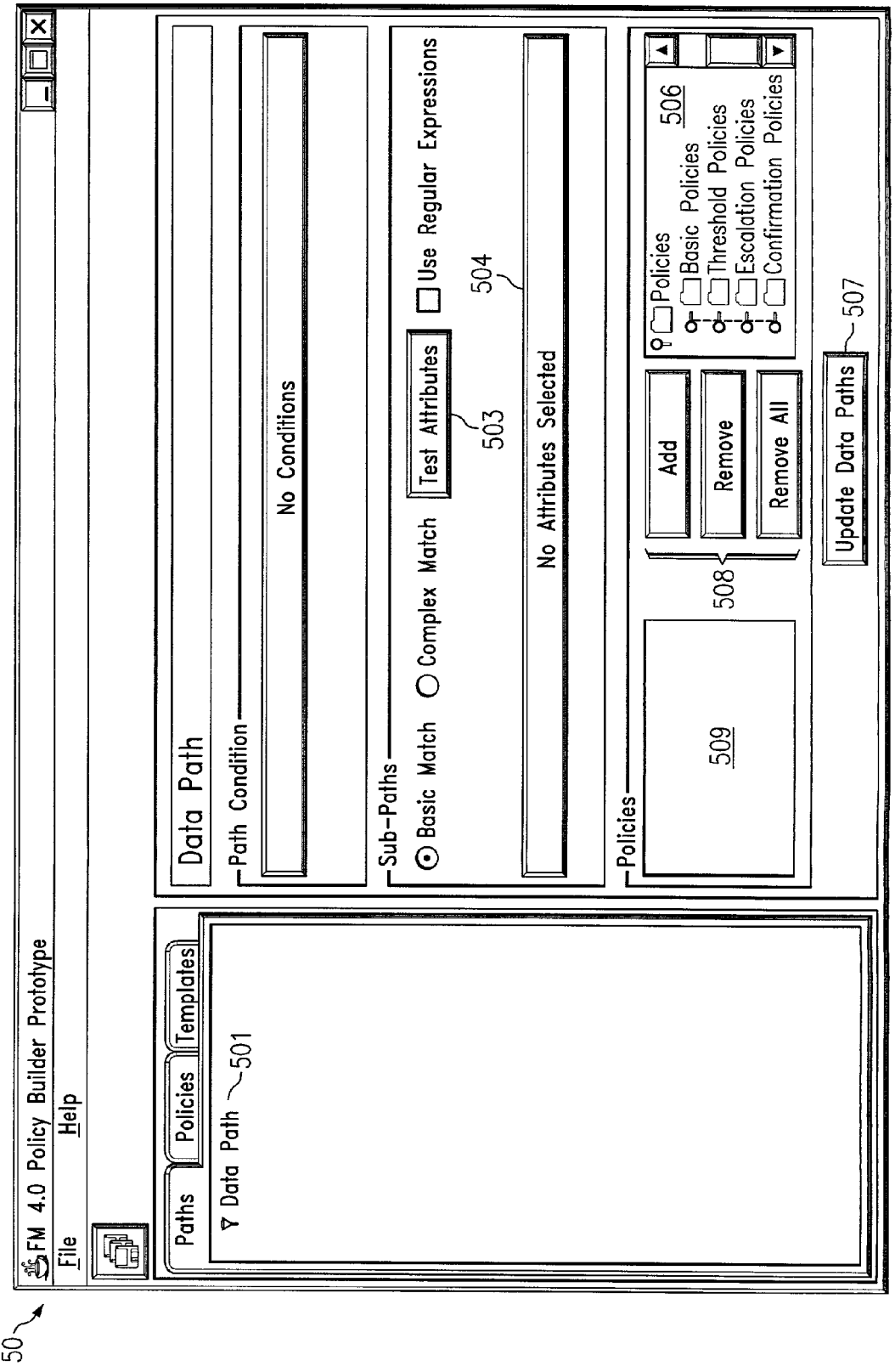
FIGS. 5A–5G show example screens depicting the definition of a data collector.

More specifically, FIG. 5A shows initial screen 50 in which root node 501 of the data path is configured. The creator specifies the attributes tested for at root node 501 by selecting Test Attributes button 503. Policy listing 506 lists all management policies currently defined in the management system. The creator may easily add and remove policies to the currently selected node, such as root node 501, by selecting a policy from policy listing 506 and using buttons 508 to assign and unassign the selected policies. Policies assigned to the selected node are listed at Assigned Policy list 509.

Figure 5B:
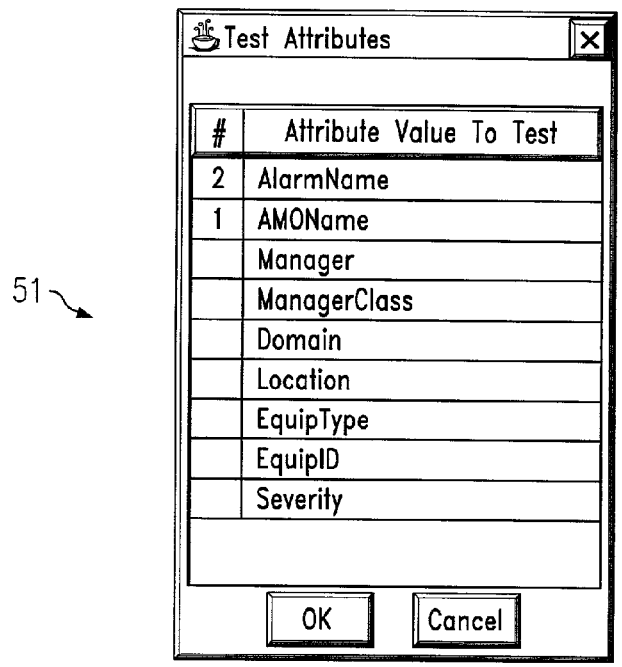
Figure 5C:
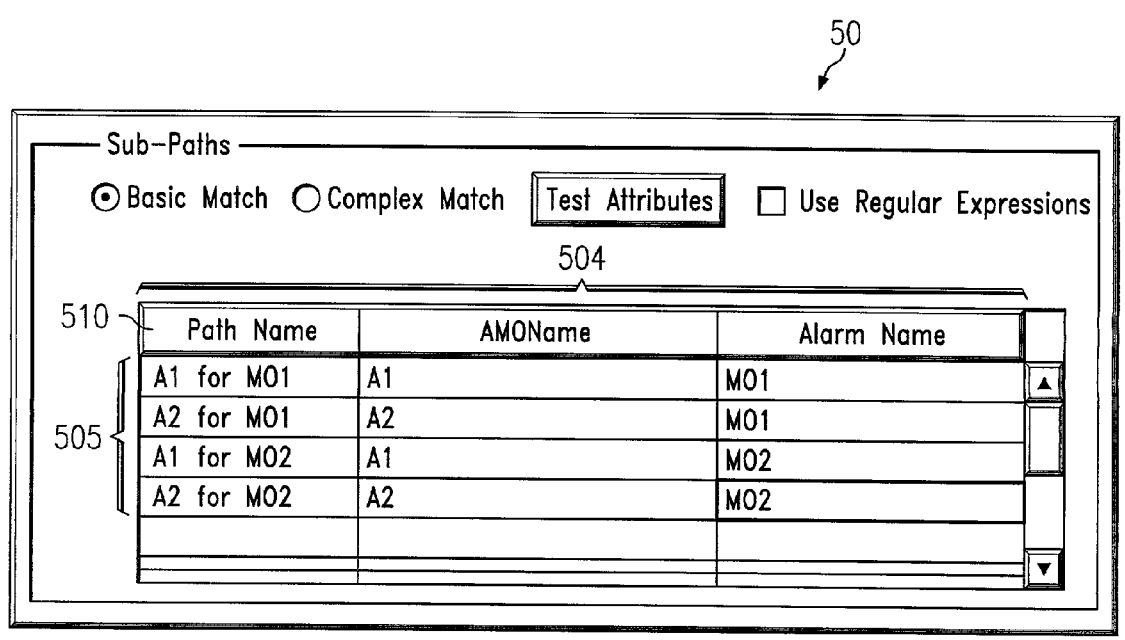

FIG. 5B shows Test attributes dialog 51 which is presented to a user (or "creator") upon selection of Test Attributes button 503. The creator then selects one or more of the listed attributes from Test Attributes dialog 51 by clicking on individual attribute names. The order in which attributes are selected may be recorded. After the selection of the desired test attributes, initial screen 50 updates to reflect the selected attributes. This is visible in FIG. 5C column heading 504. In this case, the creator has chosen the attributes AMOName and AlarmName from the test attribute interface 51 of FIG. 5B. The creator may now designate a child node's name by inputting the desired name in Path Name column 510. Each of Attribute rows 505 represents a child node and the Match Values that the data path tree, when executing, will match against. Pressing Update Data Paths button 507 (shown in FIG. 5A) updates Data Path tree root node 501.

In this instance, during the traversal of the data path tree, if the value of attribute AMOName matches the value A1 and the value of attribute AlarmName matches the value MO1, then child node A1 for MO1 becomes the selected node. Likewise, if AMOName matches A2 and AlarmName matches MO1, child node A2 for MO1 is selected. Any policies assigned to the newly selected node may then be sent to the AFM(s) designated for executing such policies. As described earlier, embodiments of the present invention may utilize a system administration configuration file in the distribution of assigned policies. Additional tree levels may be defined by creating child nodes underneath a preexisting node.

Figure 5D:
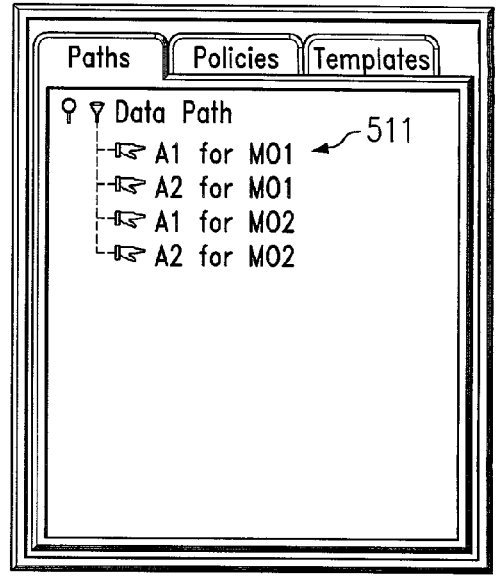
Figure 5E:
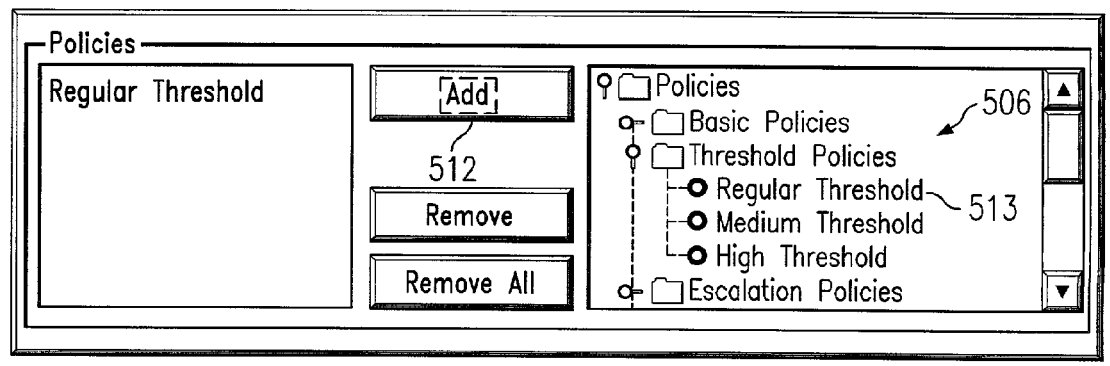
Figure 5F:
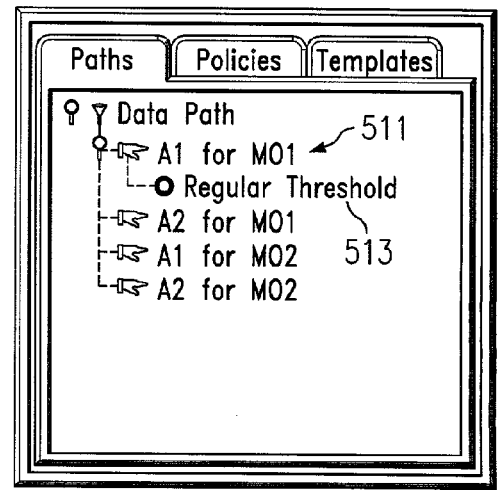

FIG. 5D shows the first step required by this particular user interface in order to associate a policy with a node. Node "A1 for MO1" 511 is first selected. As shown in FIG. 5E the creator may then select a policy from policy list 506, in this case Regular Threshold 513 is chosen. Add button 512 is then used to associate the selected policy with the selected node. FIG. 5F shows that policy Regular Threshold 513 is now associated with node "A1 for MO1" 511. Now, whenever node "A1 for MO1" 511 is traversed, policy Regular Threshold 513 is triggered. Any number of policies may be associated with a single node using this procedure.

Figure 5G:
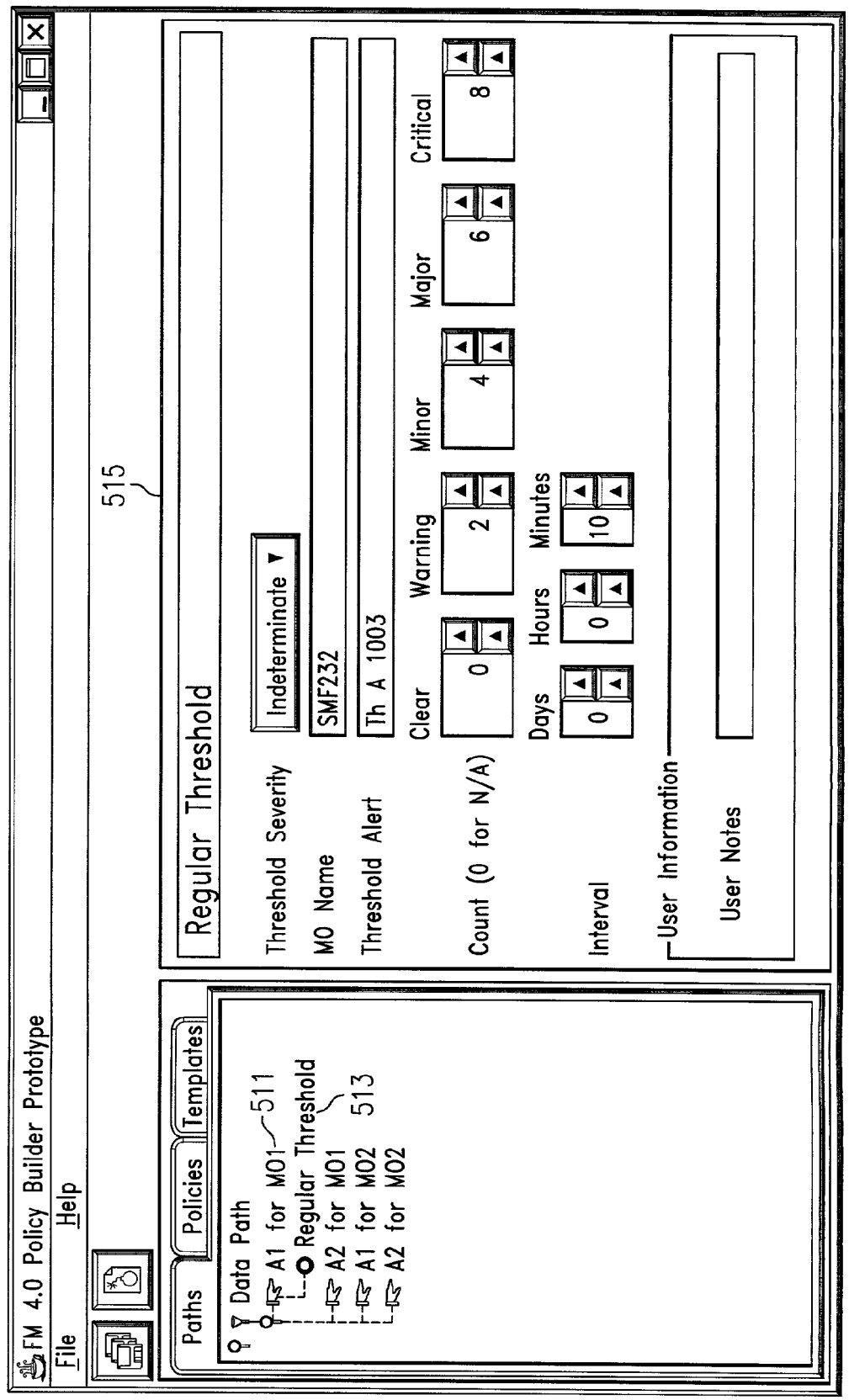

Policy Parameter panel 515 in FIG. 5G displays a number of options that may have been specified by the creator while defining the policy. Values for an exemplary policy are visible. Each policy may have different options capable of being specified by the creator based on the policy type and preferred action.

A policy builder user interface may incorporate a routine that assists in the creation of a policy based on a policy template. Such a routine may allow a creator to customize a policy template, selected from a list of existing policy templates, into a specific policy. Alternatively, a creator may opt to create policies via number of other methods such as interacting with a programming API or a flat text file. Customization of the policy template may include specifying control parameters by associating such control parameters with attributes from an attribute list.

Figure 6A:
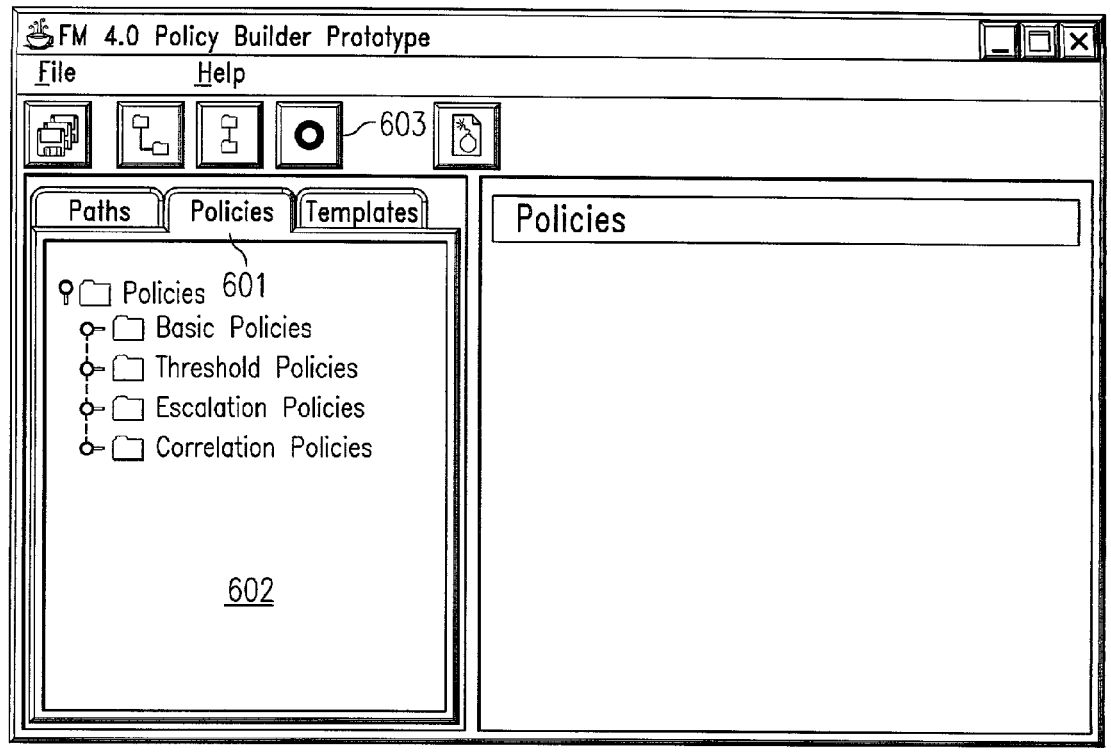
FIGS. 6A–6D show an exemplary implementation of a policy builder interface used to categorize, create and set parameter values for policies based on policy templates.
Figure 6B:
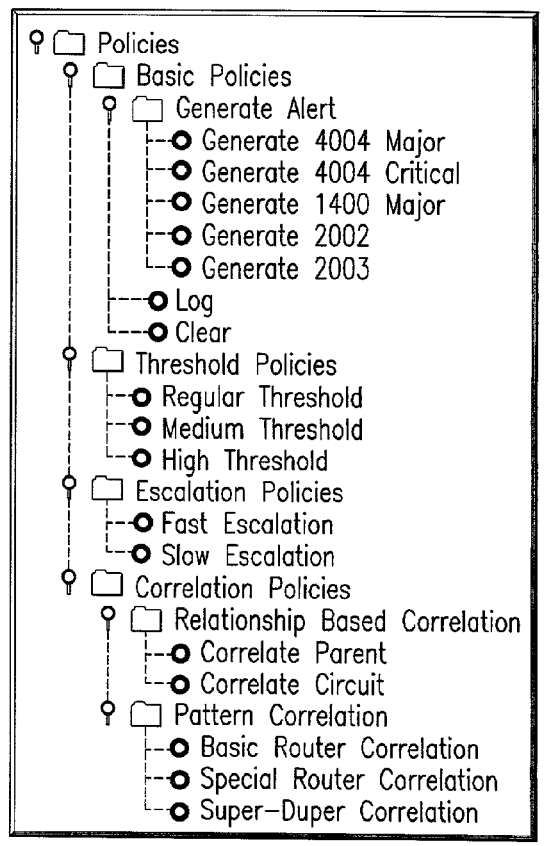
Figure 6C:
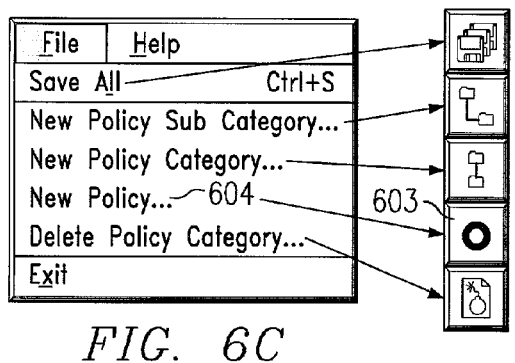
Figure 6D:
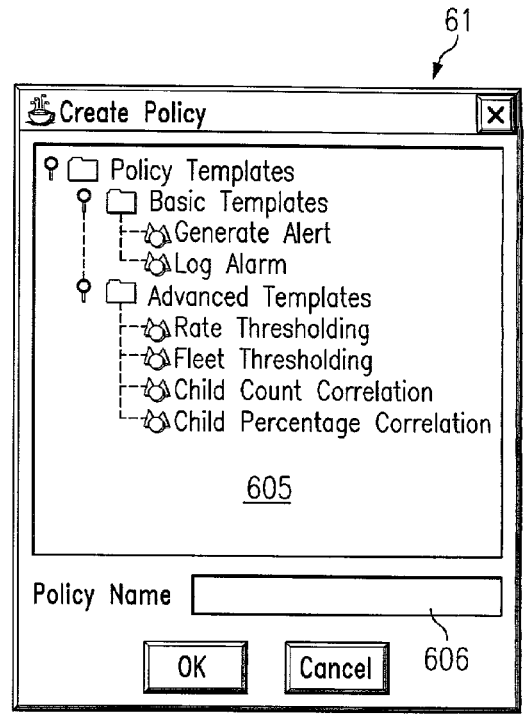

FIGS. 6A–6D show an implementation of a policy builder interface used to categorize, create and set parameter values for policies based on policy templates. FIG. 6A shows the initial window that is presented to a creator upon selection of Policies tab 601. Policy categories list 602 is visible underneath Policies Tab 601. Turning to FIG. 6B, shown is the expansion of Policy categories list 602. The creation of a new policy in this particular embodiment involves first indicating a category in which the new policy is to be classified and then either selecting New Policy button 603 or selecting "New Policy" 604 from the menu system depicted in FIG. 6C. Dialog 61 in FIG. 6D then appears. Dialog 61 prompts the creator to select a policy template from Policy Template list 605 and indicate the policy's name in Policy Name text field 606.

Figure 7A:
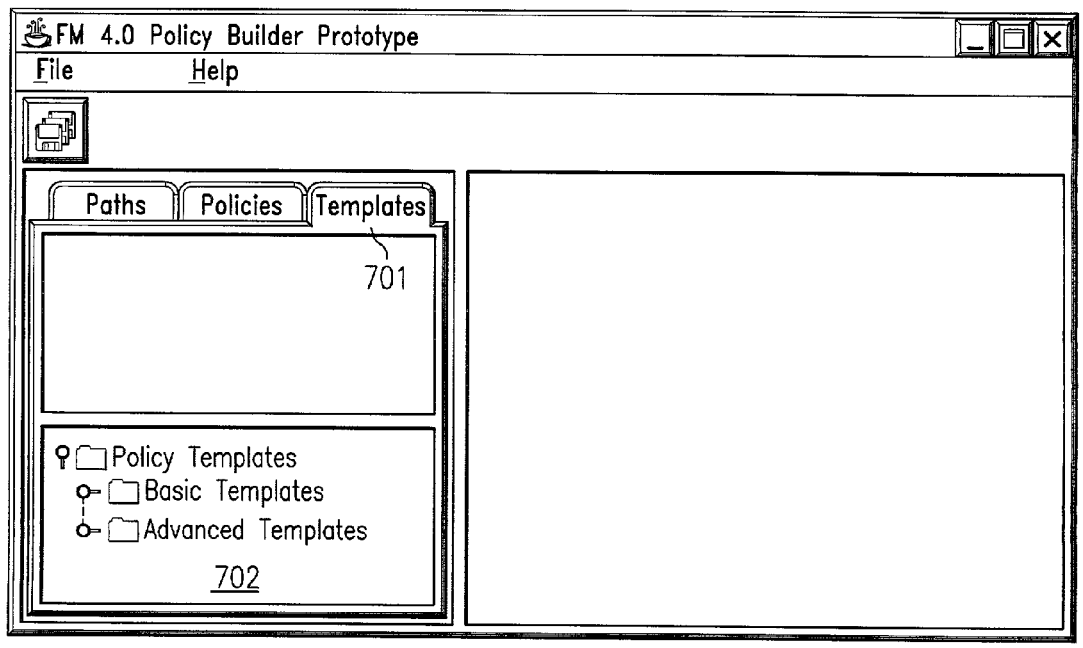
FIGS. 7A–7N show the usage of an exemplary implementation of the Policy Builder user interface in the generation of policy templates.
Figure 7B:
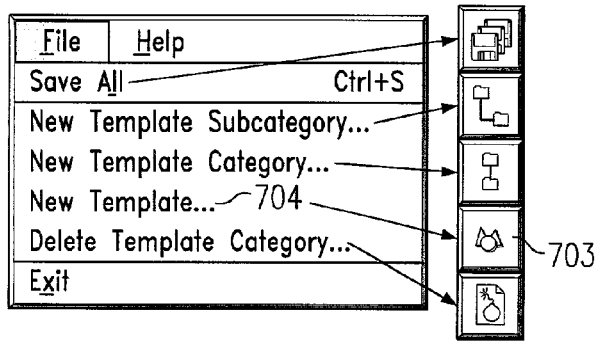
Figure 7C:
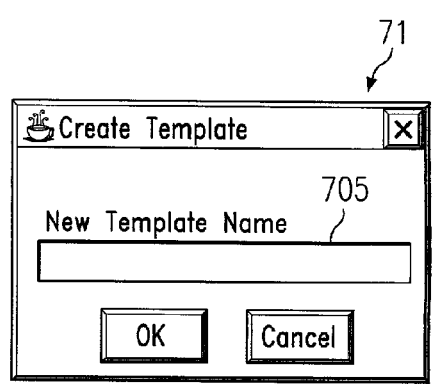
Figure 7D:
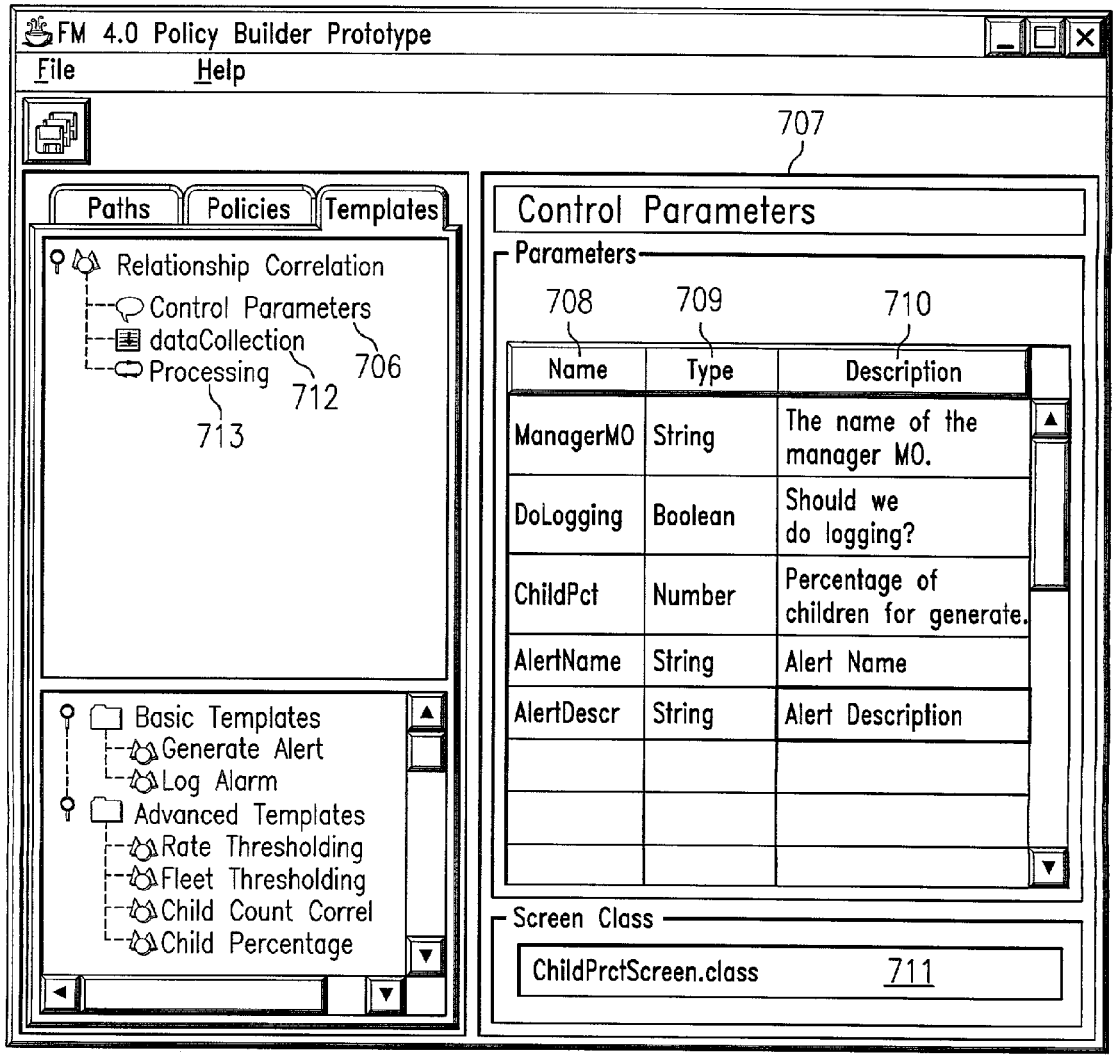
Figure 7E:
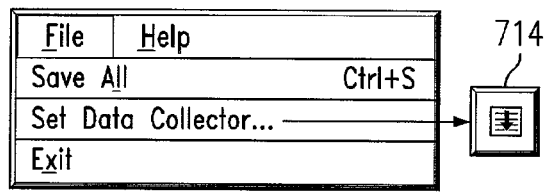
Figure 7F:
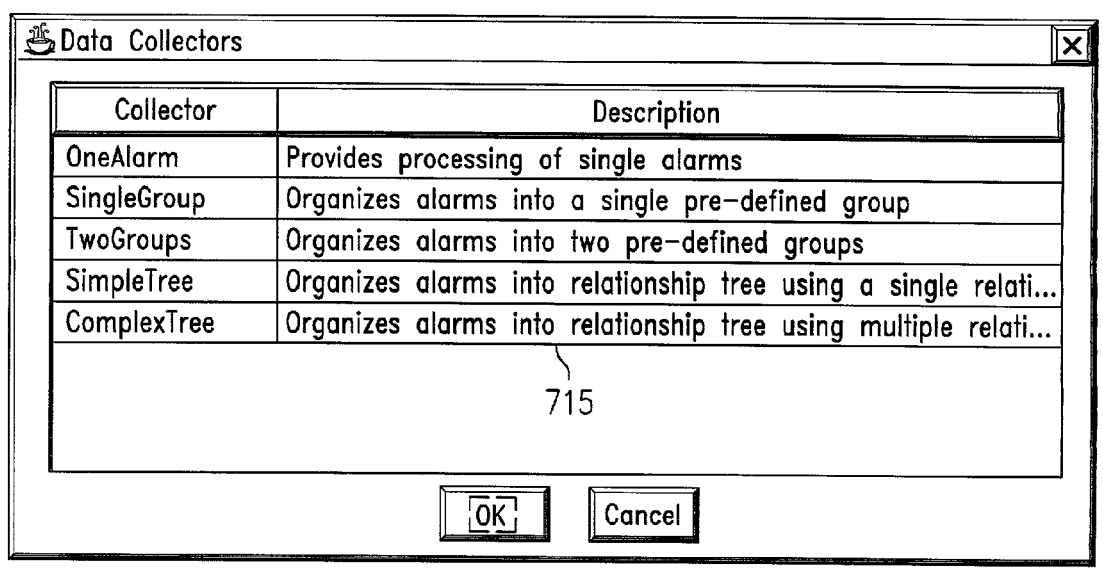
Figure 7G:
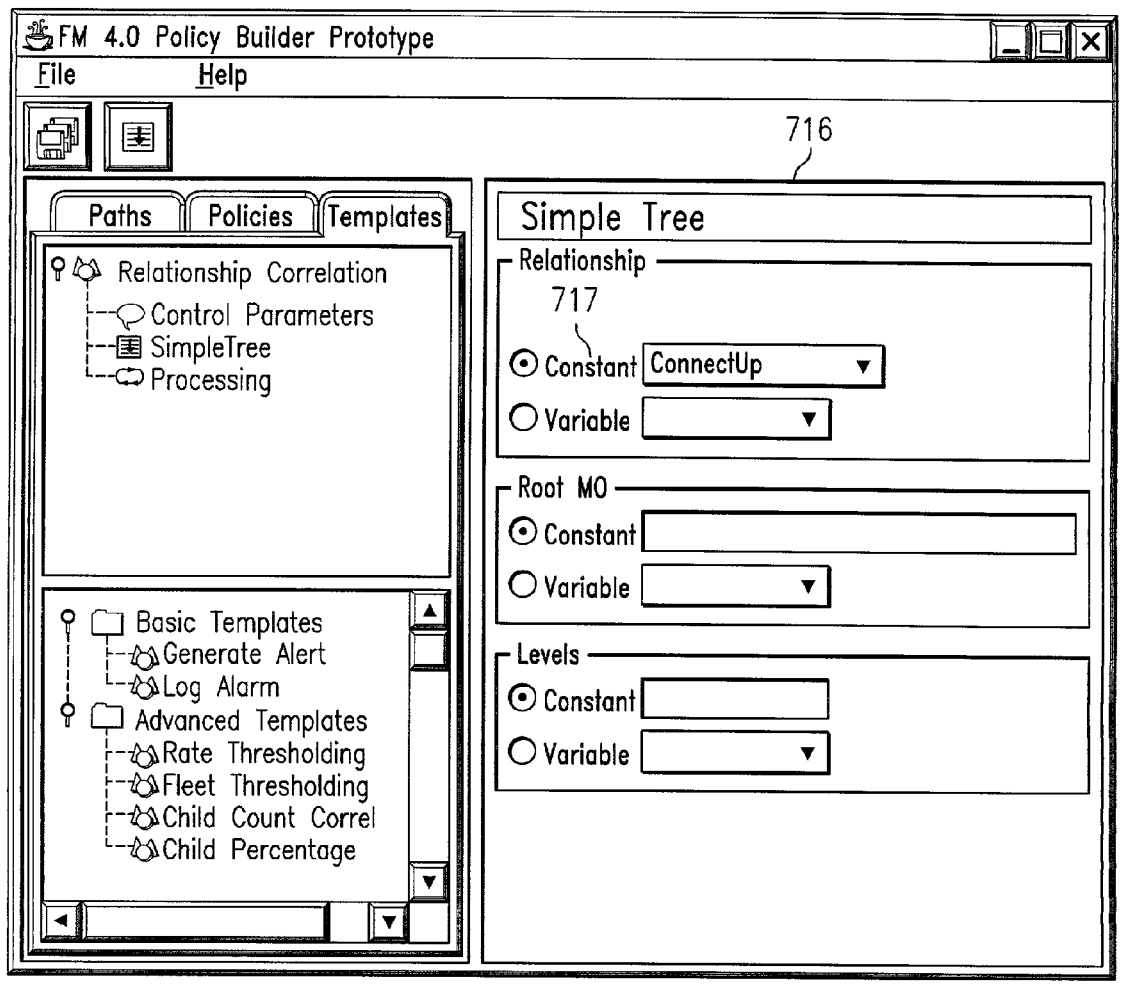
Figure 7H:
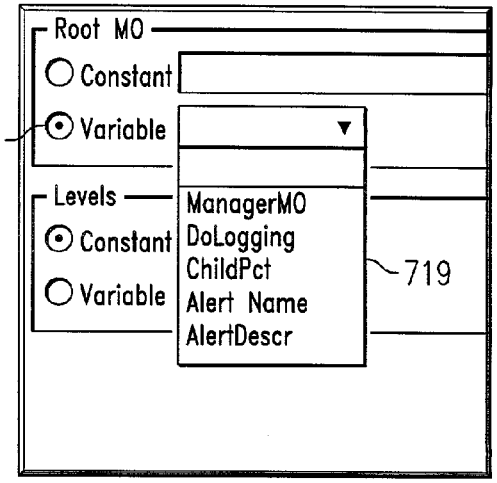
Figure 7I:
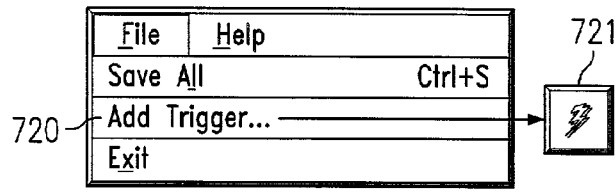
Figure 7J:
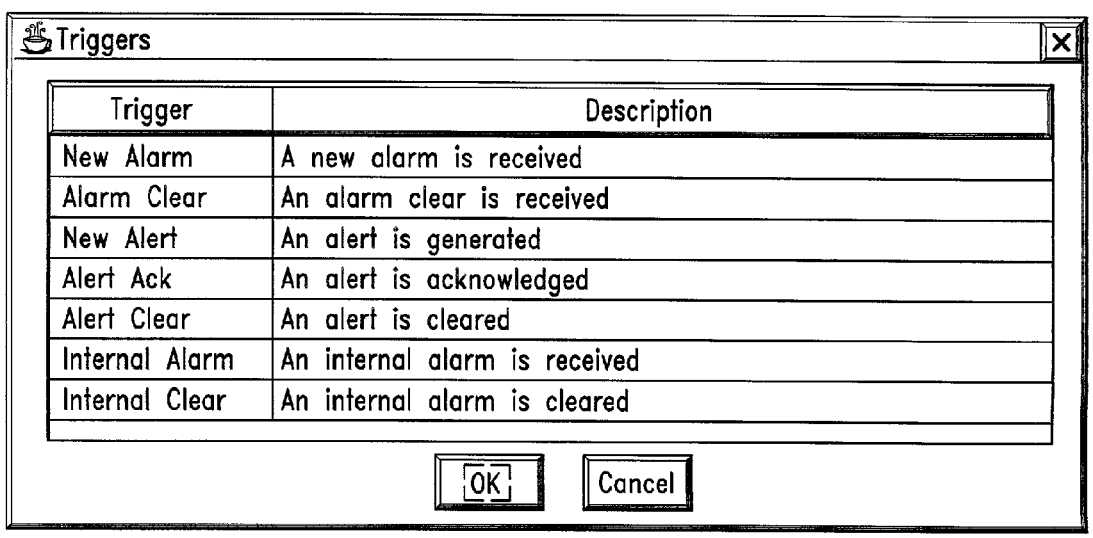
Figure 7K:
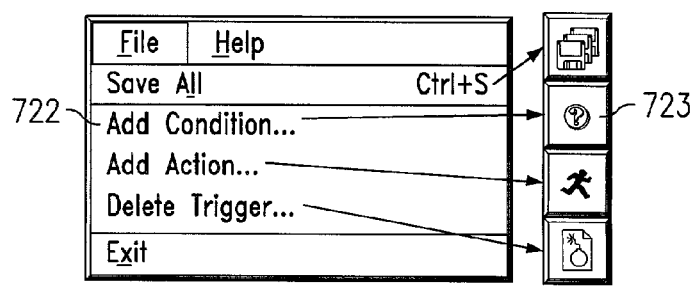
Figure 7N:
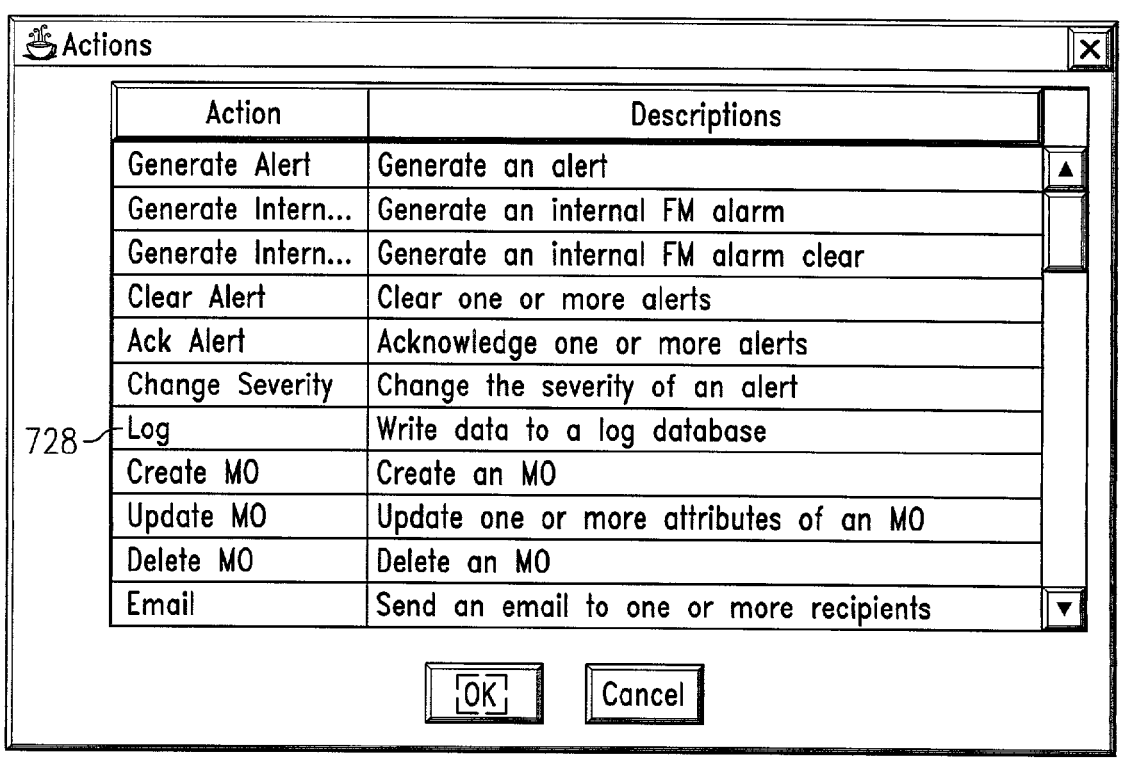

FIGS. 7A–7N show the usage of one exemplary implementation of the Policy Builder user interface in the generation of policy templates. Selection of Templates tab 701 displays Policy Template categories list 702. Policy templates may be categorized in the same manner that policies themselves may be categorized. The creation of a new policy template in this particular embodiment involves first indicating a category used in the classification of policy template and then either selecting New Policy Template button 703 or selecting New Policy Template 704 from the menu system depicted in FIG. 7B. The creator is then presented with Create Template dialog 71 in FIG. 7C which prompts for a new template name to be input into New Template Name text box 705.

After the initial steps of selecting a template name and category, the creator may begin to specify options and attributes that are inherent to the policy template being created. In this example, the first step in defining a policy template is to identify its control parameters. FIG. 7D shows the selection of control parameters node 706. The user interface then displays Control Parameters table 707 which allows the declaration of all parameters to be used in policy control. Creators may input data into the columns corresponding to parameter Name 708, parameter Type 709, and parameter Description 710, as examples. Additionally, this example includes a Screen Class text box 711 which accepts the specification of a Java class that implements a panel for the presentation of the parameters in Policy Builder. This specified class may be used in the generation of Policy Parameter panel 515 of FIG. 5G, for example.

After the establishment of the control parameters, the creator may proceed in the policy template creation process by indicating Data Collection node 712 and selecting Set Data Collector button 714 of FIG. 7E. FIG. 7F shows Data Collectors dialog 72 which presents Collector type list 715. The creator determines the desired collector type based on the complexity of the data to be collected. Example collector types include OneAlarm, which provides processing of single alarms, SingleGroup, which organizes alarms into a singe pre-defined group, TwoGroups, which organizes alarms into two pre-defined groups, SimpleTree and ComplexTree, which both allow for the organization of alarms into relationship trees suitable for processing by the policy. In other implementations, additional collector types may be made available. Likewise, the collector types described in this implementation may be removed or replaced in other embodiments.

The example screen of FIG. 7G shows the result of selecting the SimpleTree data collector type. As described in FIGS. 4A–B, data collectors may provide a system of representing and collecting relevant data representing network elements. Relationships between various network elements may be identified and classified, thus allowing for much more efficient and flexible processing of said data. SimpleTree Data Collector Detail panel 716 allows the creator to configure data for each of the various data collector types. In this example, configuration options in Data Collector Detail panels such as SimpleTree Data Collector Detail panel 716 have two possible sources, Constant or Variable. A constant value forces all policies that are created from a template to use the same value. This constant value may be specified by selecting Constant radio button 717 and specifying the desired constant value. A variable value allows the configuration item to be based on one or more control parameters previously declared during the creation of the policy template. Turning to FIG. 7H, by selecting Variable radio button 718, a Data Collector Detail panel may provide a pull down menu similar to Variable pull down menu 719 wherein a list of control parameters is provided.

After the control parameters are declared and the Data Collector assigned and configured, the creator may proceed to the creation of a processing tree. This may be done by indicating Processing node 713 found in FIG. 7D. Doing so activates Add Trigger menu item 720 and Add Trigger button 721. Once selected, Triggers dialog 72 of FIG. 7J allows the creator to select from a list of possible triggers. Triggers may be implemented as plug-ins, allowing for increased flexibility. Flexibility arises from the fact that new triggers may be created and used based on various needs and requirements. Example triggers include, New Alarm, which is triggered when a new alarm is received, Alarm Clear, which is triggered when an alarm clear signal is received, New Alert, which is triggered when an alarm is generated, Alert Ack, which is triggered upon the reception of an alert acknowledgement, Alert Clear, which is triggered when an alert clear is received, Internal Alarm, which is triggered when an internal alarm is received, and finally, Internal Clear, which responds when an internal alarm is cleared. Once the creator has selected a trigger type via Triggers dialog 72, the creator may affix conditions to the selected trigger.

A condition is added under a trigger or a result node in the template tree by first selecting the trigger or result node and then selecting Add Condition menu item 722 or Add Condition button 723 found in FIG. 7K. This causes Conditions dialog 73 of FIG. 7L to appear. Conditions dialog 73 displays several possible conditions. Conditions dialog 73 would preferably present the creator with only conditions that are applicable to the previously selected trigger type. FIG. 7M shows a screen that may be invoked after the selection of the Var condition presented in FIG. 7L. In this example, previously defined Boolean control parameter DoLogging is selected as the control parameter that will be checked during processing. This is performed by selecting DoLogging from Control Parameter Name pull down menu 725. The creator may then specify the type of check to perform and the value in which to compare to the chosen control parameter by inputting this data into table 726. Pressing Set Results button 727 causes result nodes to be created under Condition node 724.

At this point, the creator may now associate an action at the results node. This allows the creator to specify the action to be performed once processing has determined that a specified condition has been met. FIG. 7N depicts Actions dialog 74 which presents a list of several possible actions. In this particular example, Log Action 728 is chosen as the desired action. Thus, when the a New Alarm is generated, New Alarm trigger 729 causes the processing to compare Control Parameter DoLogging against the criteria specified during the Condition creation process, in this case the value true. If the comparison is successful, i.e. DoLogging's value equals true, then Log Action 728 is performed. Thus, Log Action 728 writes data to a log database. In order to add additional conditions, results, and actions, the described steps may be repeated. This allows for a wide range of processing methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a network element;
   a gateway managing the network element and receiving fault alarm incidents from the network element;
   distributed management servers communicatively associated with said gateway, said distributed management servers receiving control from said gateway to process said fault alarm incidents; and
   policy objects distributed across the distributed management servers so that each policy object resides on and is executable by a respective distributed management server, each policy object defining fault management behavior for managing the network element by the gateway, wherein a respective policy object is executed by the distributed management server on which the policy object resides in response to a respective fault alarm incident received by the gateway and associated with the policy object, to thereby implement the fault management behavior defined by the respective policy object in response to the respective fault alarm incident, wherein said gateway is capable of determining which said policy object corresponds to said fault alarm incident, said gateway capable of selecting a distributed management server from said distributed management servers that is related to said policy object, said gateway capable of routing said fault alarm incident to said selected distributed management server, said gateway capable of transferring control of processing said fault alarm incident according to said policy object to said selected distributed management server.

2. The system of claim 1 further comprising:
   a decision object stored in the gateway, the decision object defining decision behavior for routing fault alarm incidents received by the gateway from the network element to an appropriate distributed management server for execution of a policy object residing on said appropriate distributed management server.

3. The system of claim 2 wherein said decision object is a data path tree associating attributes of the network element with a respective policy object.

4. The system of claim 1 further comprising:
   a policy server communicatively coupled to the distributed management servers, the policy server storing policy objects and operable to distribute the stored policy objects to the distributed management server.

5. The system of claim 4 further comprising:
   a policy builder user interface communicatively coupled to the policy server, the policy builder user interface operable to receive input from a user for defining policy objects.

6. The system of claim 4 further comprising:
   a configuration file communicatively accessible by the policy server, the configuration file storing information defining the distributed management servers to which the policy objects are to reside.

7. The system of claim 6, further comprising:
   a policy builder comprising an interface operable to receive user input defining said information stored to the configuration file.

8. The system of claim 6 wherein the policy server comprises:
   logic executable to distribute the policy objects to the distributed management servers in accordance with the configuration file.

9. The system of claim 1 further comprising:
   an alert server generating alerts based on fault conditions in accordance with the policy objects.

10. The system of claim 1 further comprising:
    a management information base operable to store software objects corresponding to the network element.

11. A method comprising:
    implementing a gateway managing a network element and receiving fault alarm incidents from the network element;
    implementing distributed management servers communicatively associated with the gateway, the distributed management servers receiving control from the gateway to process said fault alarm incidents; and
    providing policy objects distributed across the distributed management servers so that each policy object resides on, and executable by, a respective distributed management server, each policy object defining fault management behavior for managing the network element by the gateway, wherein a respective policy object is executed by the distributed management server on which the respective policy object resides in response to a respective fault alarm incident received by the gateway and associated with the respective policy object, to thereby implement the fault management behavior defined by the respective policy object in response to the respective fault alarm incident;

wherein the gateway is capable of determining which of the policy objects corresponds to the fault alarm incident, the gateway capable of selecting a distributed management server from the distributed management servers that is related to the policy object, the gateway capable of routing the fault alarm incident to the selected distributed management server, the gateway capable of transferring control of processing the fault alarm incident according to the policy object to the selected distributed management server.

12. The method of claim 11 further comprising:

storing a decision object on the gateway, the decision object defining decision behavior for routing fault alarm incidents received by the gateway from the network element to an appropriate distributed management server for invoking execution of a respective policy object.

13. The method of claim 12 wherein the decision object is a data path tree associating attributes of the network element with a respective policy object.

14. The method of claim 11 further comprising:

storing the policy objects on a policy server communicatively coupled to the distributed management servers; and policy server distributing the stored policy objects to the distributed management servers.

15. The method of claim 14 further comprising:

user interacting with a policy builder interface that is communicatively coupled to said policy server for defining the policy objects.

16. The method of claim 14 further comprising:

determining an appropriate distributed management server of the distributed management servers to which a respective policy object stored on the policy server will be distributed, based at least in part on information stored in a configuration file communicatively accessible by the policy server.

17. The method of claim 16 further comprising:

user inputting said information stored to the configuration file.

18. The method of claim 11 further comprising:

an alert server generating an alert based on a fault condition for the network element in accordance with a respective policy object.

19. A system comprising:

a plurality of gateways, each gateway managing a network element and receiving fault alarm incidents from the managed network element;

software objects, each software object defining fault management behavior for managing a network element; and distributed management servers across which the software objects are distributed so that each software object resides on, and is executed by, a respective distributed management server, wherein a respective software object is executed by the distributed management server on which the respective software object resides in response to a respective fault alarm incident received by a respective gateway and associated with the software object, to thereby implement the fault management behavior defined by the software object in response to the respective fault alarm incident, said distributed management servers communicatively associated with said plurality of gateways, said distributed management servers receiving control from said plurality of gateways to process said fault alarm incidents;

wherein said plurality of gateways is capable of determining which said policy object corresponds to said fault alarm incident, said plurality of gateways capable of selecting a distributed management server from said distributed management servers that is related to said policy object, said plurality of gateways capable of routing said fault alarm incident to said selected distributed management server, said plurality of gateway capable of transferring control of processing said fault alarm incident according to said policy object to said selected distributed management server.

20. The system of claim 19 wherein each gateway comprises:

logic for routing fault alarm incidents received by the network element managed by the respective gateway to the distributed management servers.

21. The system of claim 19 further comprising:

means for associating attributes of the managed network elements with the distributed management servers for implementing the fault management behaviors defined by the software objects.

22. The system of claim 19 further comprising:

means for distributing the software objects to the distributed management servers.

23. The system of claim 22 further comprising:

means for graphically generating the software objects.

24. The system of claim 19 further comprising:

means for generating alerts.

* * * * *

UNITED STATES PATENT AND TRADEMARK OFFICE
CERTIFICATE OF CORRECTION

| | | |
|---|---|---|
| PATENT NO. | : 7,043,660 B1 | Page 1 of 1 |
| APPLICATION NO. | : 09/972541 | |
| DATED | : May 9, 2006 | |
| INVENTOR(S) | : Bolar | |

It is certified that error appears in the above-identified patent and that said Letters Patent is hereby corrected as shown below:

On the face page, in field (56), under "U.S. Patent Documents", in column 2, line 9, delete "714/4" and insert -- 714/004 --, therefor.

Signed and Sealed this

Twenty-first Day of November, 2006

JON W. DUDAS
*Director of the United States Patent and Trademark Office*